US009468272B1

(12) United States Patent
Hyde et al.

(10) Patent No.: US 9,468,272 B1
(45) Date of Patent: Oct. 18, 2016

(54) SMART CANE WITH EXTENSIONS FOR NAVIGATING STAIRS

(71) Applicant: Elwha LLC, Bellevue, WA (US)

(72) Inventors: Roderick A. Hyde, Redmond, WA (US); Jordin T. Kare, San Jose, CA (US); William David Duncan, Mill Creek, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/835,908

(22) Filed: Aug. 26, 2015

Related U.S. Application Data

(63) Continuation-in-part of application No. 14/684,853, filed on Apr. 13, 2015.

(51) Int. Cl.
*A45B 3/00* (2006.01)
*A45B 9/04* (2006.01)
*A61H 3/00* (2006.01)
*A61H 3/06* (2006.01)
*G01B 21/00* (2006.01)
(Continued)

(52) U.S. Cl.
CPC . *A45B 9/04* (2013.01); *A45B 3/00* (2013.01); *A61H 3/00* (2013.01); *A61H 3/02* (2013.01); *A61H 3/061* (2013.01); *A61H 3/068* (2013.01); *G01B 21/00* (2013.01); *A45B 2009/002* (2013.01); *A45B 2009/005* (2013.01)

(58) Field of Classification Search
CPC .............. A61H 2003/001; A61H 2003/063; A45B 9/04; A45B 2009/002; A45B 2009/005
USPC ................................ 135/65, 66, 68, 70, 77
See application file for complete search history.

(56) References Cited

U.S. PATENT DOCUMENTS 2,753,879 A * 7/1956 Murray Rosen .......... A45B 3/00
135/15.1
4,091,828 A * 5/1978 Jorgensen .............. F16M 13/08
135/66
(Continued)

FOREIGN PATENT DOCUMENTS

CN         202959098    *  6/2013
WO     WO 2013181663    * 12/2013    ............... A45B 9/04

OTHER PUBLICATIONS 3 page English translation of CN 20295098 from Google Patents, translated Apr. 2016.*

(Continued)

*Primary Examiner* — Robert Canfield

(57) ABSTRACT

Devices and systems are described including a walking aid including a linear rod having a first end and a second end, a hand grip disposed in proximity to the first end of the linear rod, two or more extendable and retractable self-leveling load-bearing feet at the second end of the linear rod, at least one sensor configured to detect a parameter of a walking surface in proximity to the second end of the linear rod, and a controller including a microprocessor and circuitry, the controller operably coupled to the two or more extendable and retractable self-leveling load-bearing feet and the at least one sensor, and including circuitry configured to receive information regarding the detected parameter of the walking surface from the at least one sensor and circuitry configured to actuate at least one of the two or more extendable and retractable self-leveling load-bearing feet in response to the information regarding the detected parameter of the walking surface.

41 Claims, 9 Drawing Sheets

(51) Int. Cl.
*A61H 3/02* (2006.01)
*A45B 9/00* (2006.01)

(56) References Cited

U.S. PATENT DOCUMENTS

| | | | |
|---|---|---|---|
| 4,924,573 A | 5/1990 | Huddleston et al. | |
| 4,962,781 A | 10/1990 | Kanbar | |
| 5,282,486 A * | 2/1994 | Hoover | A61H 3/02 135/69 |
| 5,755,245 A * | 5/1998 | Van Helvoort | A45B 3/00 135/65 |
| 5,775,352 A | 7/1998 | Obitts | |
| 6,192,908 B1 * | 2/2001 | Smith | A45B 5/00 135/65 |
| 6,651,684 B2 * | 11/2003 | Spitzer | A45B 1/00 135/77 |
| 7,104,056 B2 | 9/2006 | Taya et al. | |
| D531,399 S * | 11/2006 | Olerud | D3/7 |
| 7,219,679 B2 * | 5/2007 | Hsu | B26B 13/24 135/65 |
| 7,344,320 B2 * | 3/2008 | Barker | F16M 11/14 135/66 |
| 7,373,942 B1 | 5/2008 | Yeager | |
| 7,882,847 B2 | 2/2011 | Coe | |
| 7,918,237 B1 * | 4/2011 | Kuo | A61H 3/02 135/65 |
| 8,077,020 B2 * | 12/2011 | Behm | A61H 3/061 135/911 |
| 8,286,281 B1 | 10/2012 | Toothman | |
| 8,464,737 B2 * | 6/2013 | La Chimia | A61H 3/0244 135/66 |
| 8,586,176 B2 | 11/2013 | Taya et al. | |
| 8,607,809 B2 * | 12/2013 | Jordan | 135/66 |
| 8,714,173 B2 * | 5/2014 | Rosen | A45B 9/04 135/77 |
| 9,119,757 B2 * | 9/2015 | Triolo | A61H 3/00 |
| 9,155,675 B2 * | 10/2015 | Ye | A61H 3/061 |
| 2003/0178054 A1 | 9/2003 | Jacobowitz | A61H 3/0288 135/77 |
| 2005/0056739 A1 * | 3/2005 | Koning | F16M 11/16 248/171 |
| 2007/0175503 A1 * | 8/2007 | Gordon | A61H 3/0288 135/65 |
| 2008/0011344 A1 * | 1/2008 | Barker | F16M 11/14 135/66 |
| 2011/0037560 A1 * | 2/2011 | Belloteau | A61H 3/061 340/4.1 |
| 2011/0100404 A1 * | 5/2011 | La Chimia | A61H 3/0244 135/77 |
| 2011/0220161 A1 * | 9/2011 | Jordan | A45B 3/04 135/66 |
| 2013/0206195 A1 * | 8/2013 | Rosen | A61H 3/0277 135/82 |
| 2014/0033549 A1 | 2/2014 | Ramsey et al. | |
| 2014/0109944 A1 | 4/2014 | Triolo et al. | |
| 2014/0251397 A1 * | 9/2014 | Van Den Driesche | A61H 3/02 135/69 |
| 2015/0189959 A1 * | 7/2015 | Rizzo | A45B 9/04 135/85 |

OTHER PUBLICATIONS

Chuang et al.; "Detection system of incident slippage and friction coefficient based on a flexible tactile sensor with structural electrodes"; Sensors and Actuators A: Physical; bearing a date of Aug. 8, 2011; pp. 48-55; vol. 188; Elsevier B.V.

Dahiya et al.; "Tactile Sensing—From Humans to Humanoids"; IEEE Transactions on Robotics; Feb. 2010; pp. 1-20; vol. 26, No. 1; IEEE.

"Factors affecting design—Motor Springs"; Spiroflex product sheet; uploaded Aug. 24, 2015; 2 pages; Issue No. 1(Mtr_apr_A/eng).

GP2Y0A60SZ0F/GP2Y0A60SZLF; "Distance Measuring Sensor Unit Measuring distance: 10 to 150 cm Analog output type"; SHARP—Sheet No. OP13005EN; uploaded on Aug. 24, 2015; pp. 1-10.

Granosik et al.; "Pneumatic actuators for serpentine robot"; 8th International Conference on Walking and Climbing Robots (CLAWAR); Sep. 12-15, 2005; pp. 1-6.

Jamali et al.; "Texture Recognition by Tactile Sensing"; Australasian Conference on Robotics and Automation (ACRA); Dec. 2-4, 2009; 9 pages.

Nakamura et al.; "A Tactile Sensor Instantaneously Evaluating Friction Coefficients"; The 11th International Conference on Solid-State Sensors and Actuators; Jun. 10-14, 2001; pp. 1430-1433.

Sabesan et al.; "Wide Area Passive UHF RFID System Using Antenna Diversity Combined With Phase and Frequency Hopping"; IEEE Transactions on Antennas and Propagation; Feb. 2014; pp. 878-888; vol. 62, No. 2; IEEE.

Sheinker et al.; "Localization in 3-D Using Beacons of Low Frequency Magnetic Field"; IEEE Transactions on Instrumentation and Measurement; Dec. 2013; pp. 3194-3201; vol. 62, No. 12; IEEE.

Tanigawa et al.; "Drift-Free Dynamic Height Sensor using MEMS IMU Aided by MEMS Pressure Sensor"; Proceedings of the 5th Workshop on Positioning, Navigation and Communication 2008; uploaded Aug. 12, 2015; pp. 191-196; IEEE.

"Vacuum Knowledge"; Schmalz product sheet; uploaded Aug. 24, 2015; pp. 17-61.

Wijaya et al.; "Object Exploration using Whisker Sensors"; Proc. 2002 Australasian Conference on Robotics and Automation; Nov. 27-29, 2002; pp. 180-185; ARAA.

Ye et al.; "Pen-type Sensor for Surface Texture Perception"; 16th IEEE International Conference on Robot & Human Interactive Communication; Aug. 26-29, 2007; pp. 642-647; IEEE.

Yusuf et al.; "Mechanical Energy Harvesting Devices for Low Frequency Applications: Revisited"; ARPN Journal of Engineering and Applied Sciences; Jul. 2013; pp. 504-512; vol. 8, No. 7; Asian Research Publishing Network (ARPN).

* cited by examiner

FIG. 2A
FIG. 2B
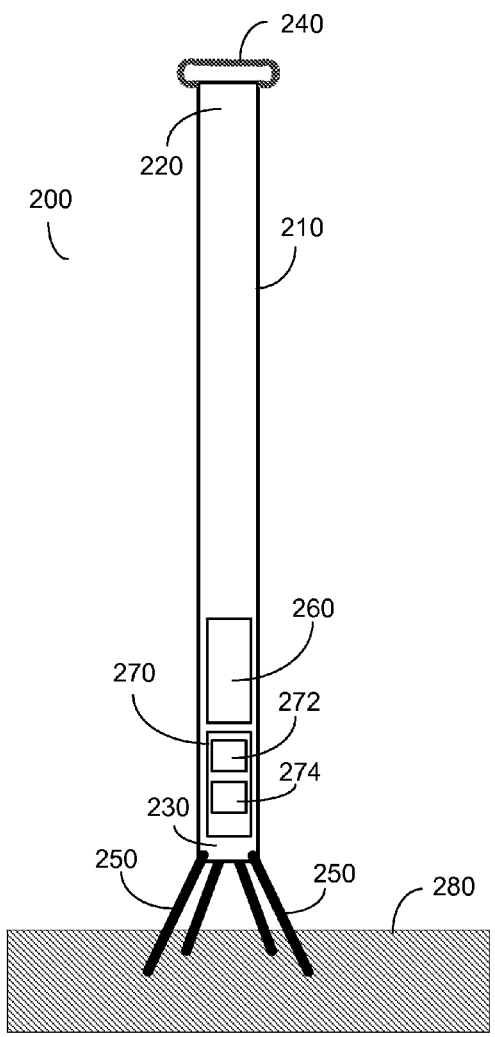
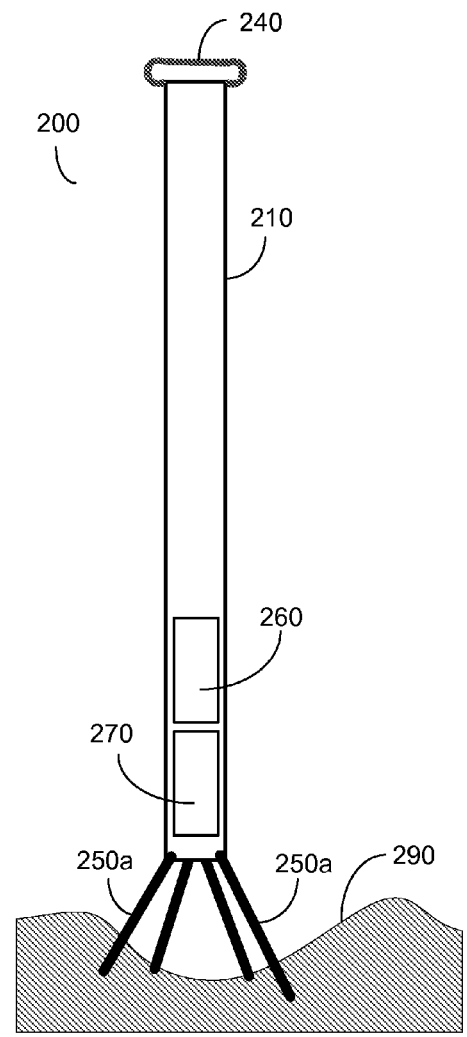

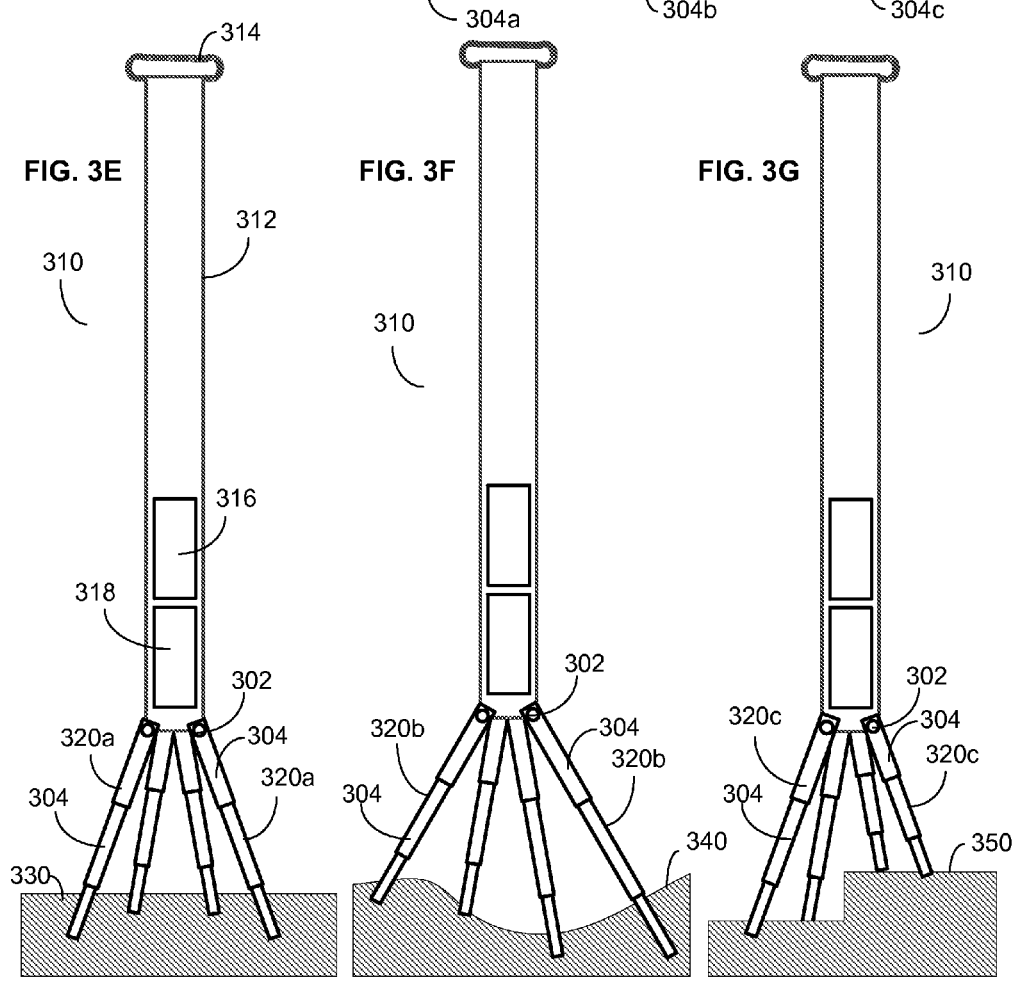

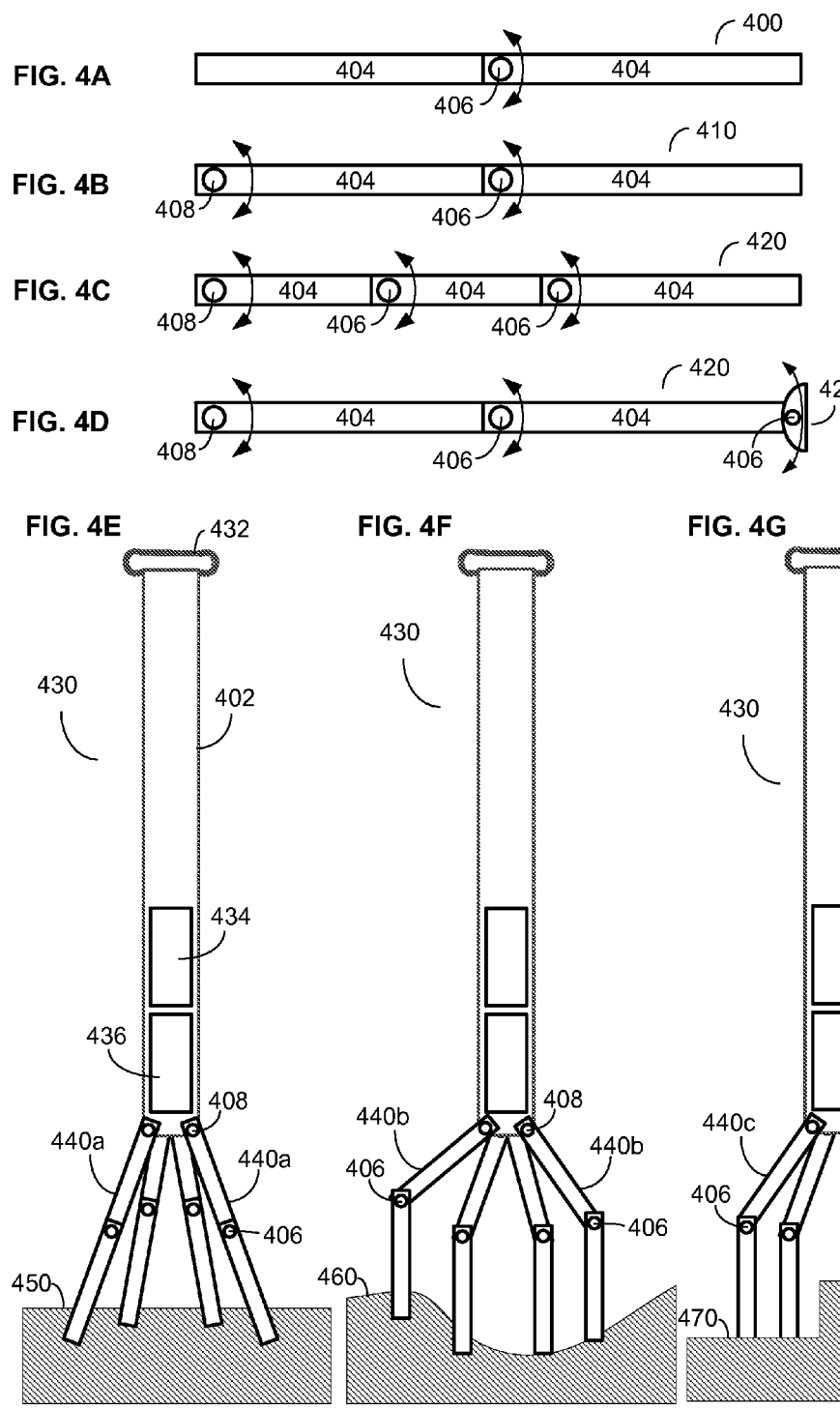

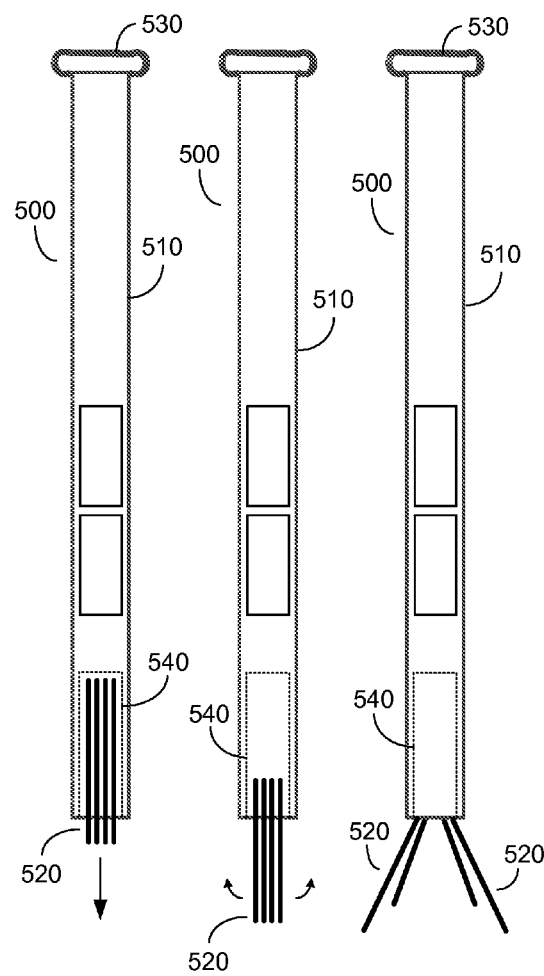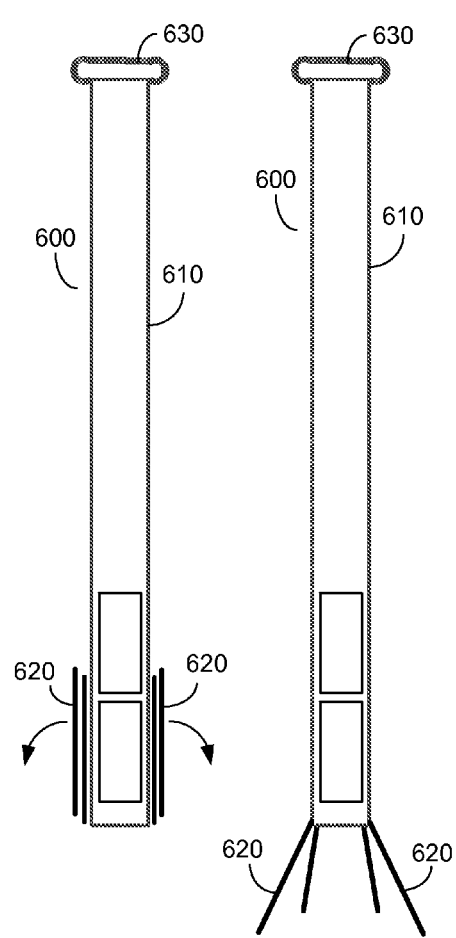

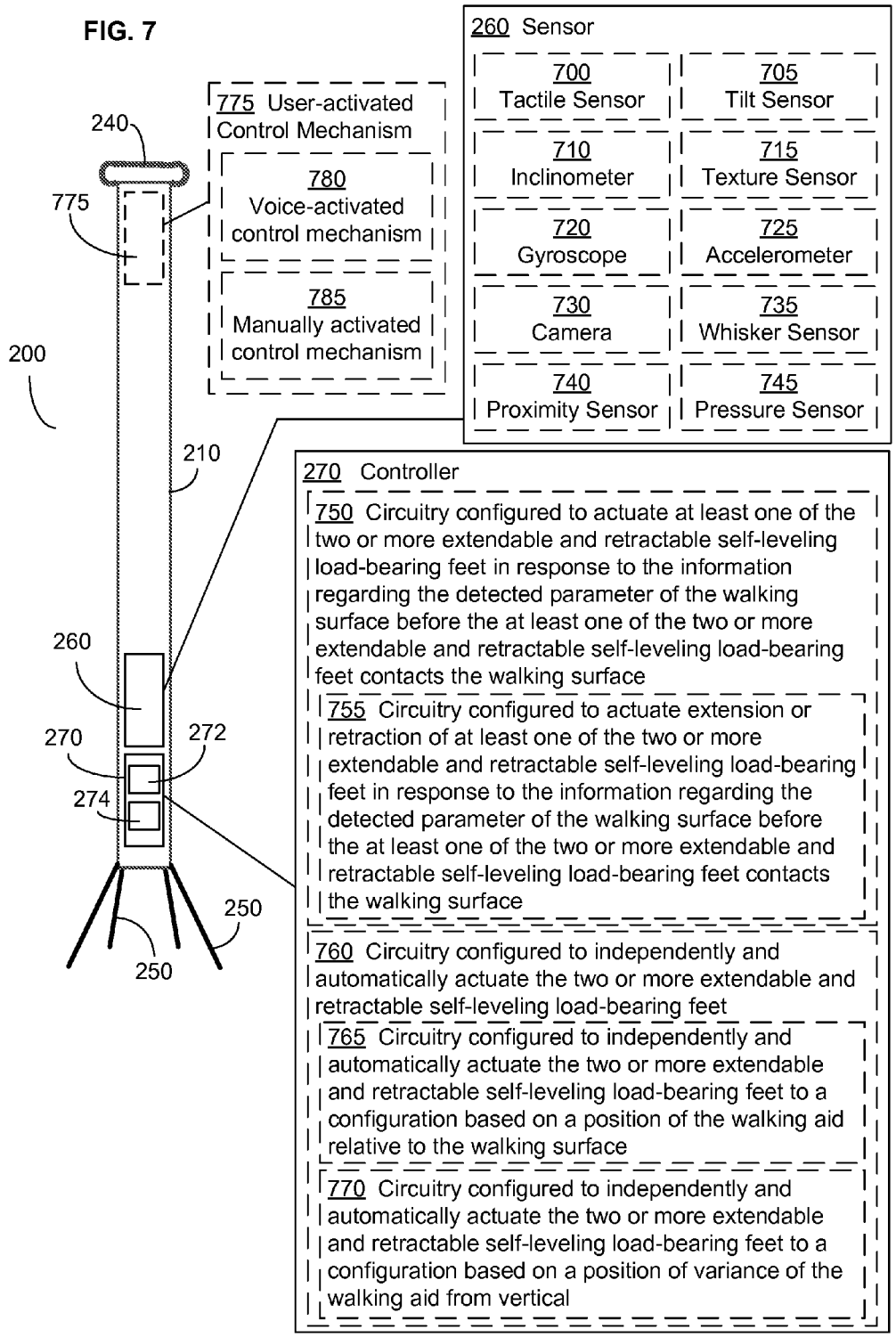

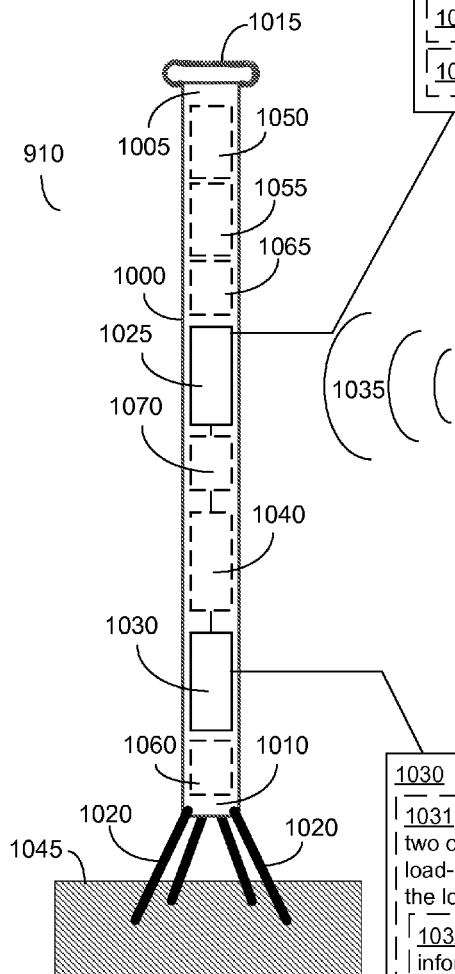

FIG. 10

1025 Receiver
1070 Configured to receive at least one of a radio signal, a magnetic signal, an acoustic signal, an electromagnetic signal, or an optical signal
1071 Electromagnetic signal receiver
1072 Magnetic signal receiver
1073 Radiofrequency signal receiver
1074 Photodetector
1075 Infrared sensor
1076 Microphone

920 Remote Signaling Device
921 One or more beacons
922 Emits a radio signal, a magnetic signal, an acoustic signal, an electromagnetic signal, or an optical signal
923 Electromagnetic signal generator
924 Radiofrequency signal generator
925 Microwave signal generator
926 Magnetic signal generator
927 Acoustic signal generator
928 RFID signal/receiver
929 Local positioning system

1030 Controller
1031 Circuitry configured to actuate at least one of the two or more extendable and retractable self-leveling load-bearing feet based on the information regarding the location of the walking aid in the environment
1032 Circuitry configured to correlate the information regarding the location of the walking aid in the environment with a map of the environment

SMART CANE WITH EXTENSIONS FOR NAVIGATING STAIRS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

The present application constitutes a continuation-in-part of U.S. patent application Ser. No. 14/684,853, entitled STRUCTURAL FRAME TO ASSIST PATIENTS AND METHODS OF USE THEREOF, naming Mahalaxmi Gita Bangera, Jesse R. Cheatham, III, Hon Wah Chin, Roderick A. Hyde, Muriel Y. Ishikawa, Jordin T. Kare, Eric C. Leuthardt, Robert W. Lord, Richard T. Lord, Robert C. Petroski, Clarence T. Tegreene, Lowell L. Wood, Jr. as inventors, filed 13, Apr., 2015, which is currently co-pending or is an application of which a currently co-pending application is entitled to the benefit of the filing date.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

In an aspect, a walking aid includes, but is not limited to, a linear rod having a first end and a second end; a hand grip disposed in proximity to the first end of the linear rod; two or more extendable and retractable self-leveling load-bearing feet at the second end of the linear rod; at least one sensor configured to detect a parameter of a walking surface in proximity to the second end of the linear rod; and a controller including a microprocessor and circuitry, the controller operably coupled to the two or more extendable and retractable self-leveling load-bearing feet and the at least one sensor and including circuitry configured to receive information regarding the detected parameter of the walking surface from the at least one sensor and circuitry configured to actuate at least one of the two or more extendable and retractable self-leveling load-bearing feet in response to the information regarding the detected parameter of the walking surface. In addition to the foregoing, other walking aid aspects are described in the claims, drawings, and text forming a part of the present disclosure.

In an aspect, a system includes, but is not limited to, a walking aid including a linear rod having a first end and a second end; a hand grip disposed in proximity to the first end of the linear rod; two or more extendable and retractable self-leveling load-bearing feet at the second end of the linear rod; at least one receiver; and a controller attached to the linear rod and operably coupled to the at least one receiver and to the two or more extendable and retractable self-leveling load-bearing feet; and a remote signaling device in wireless communication with the at least one receiver of the walking aid, the remote signaling device configured to transmit a signal, wherein the at least one receiver is configured to receive the signal from the remote signaling device and configured to transform the signal into information regarding a location of the walking aid in an environment, and wherein the controller includes circuitry configured to actuate at least one of the two or more extendable and retractable self-leveling load-bearing feet based on the information regarding the location of the walking aid in the environment. In addition to the foregoing, other system aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2A is a schematic of a walking aid on a flat walking surface.

FIG. 2B is a schematic of a walking aid on a stepped walking surface.

FIG. 3A is a schematic of an extendable and retractable self-leveling load-bearing foot with two or more telescoping segments in a retracted state.

FIG. 3B is a schematic of an extendable and retractable self-leveling load-bearing foot with two or more telescoping segments in an extended state.

FIG. 3C is a schematic of an extendable and retractable self-leveling load-bearing foot with a pivot connection and two or more telescoping segments in a retracted state.

FIG. 3D is a schematic of an extendable and retractable self-leveling load-bearing foot with a pivot connection and two or more telescoping segments in an extended state.

FIG. 3E is a schematic of a walking aid with extendable and retractable self-leveling load-bearing feet with a pivot connection and two or more telescoping segments on a flat walking surface.

FIG. 3F is a schematic of a walking aid with extendable and retractable self-leveling load-bearing feet with a pivot connection and two or more telescoping segments on an uneven walking surface.

FIG. 3G is a schematic of a walking aid with extendable and retractable self-leveling load-bearing feet with a pivot connection and two or more telescoping segments on a stepped walking surface.

FIG. 4A is a schematic of an extendable and retractable self-leveling load-bearing foot with a pivot.

FIG. 4B is a schematic of an extendable and retractable self-leveling load-bearing foot with two pivots.

FIG. 4C is a schematic of an extendable and retractable self-leveling load-bearing foot with three pivots.

FIG. 4D is a schematic of an extendable and retractable self-leveling load-bearing foot with a pivoting foot pad.

FIG. 4E is a schematic of a walking aid with extendable and retractable self-leveling load-bearing feet with pivots on a flat walking surface.

FIG. 4F is a schematic of a walking aid with extendable and retractable self-leveling load-bearing feet with pivots on an uneven walking surface.

FIG. 4G is a schematic of a walking aid with extendable and retractable self-leveling load-bearing feet with pivots on a stepped walking surface.

FIG. 5A is a schematic of a walking aid with extendable and retractable self-leveling load-bearing feet retracted for storage within an interior portion of the linear rod.

FIG. 5B is a schematic of a walking aid with extendable and retractable self-leveling load-bearing feet pushed out of an interior portion of the linear rod.

FIG. 5C is a schematic of a walking aid with extendable and retractable self-leveling load-bearing feet extended for use.

FIG. 6A is a schematic of a walking aid with extendable and retractable self-leveling load-bearing feet retracted for storage along a side of the linear rod.

FIG. 6B is a schematic of a walking aid with extendable and retractable self-leveling load-bearing feet extended for use.

FIG. 7 shows further aspects of a walking aid such as depicted in FIG. 2A.

FIG. 10 is a schematic of a system including a walking aid and a remote signaling device.

DETAILED DESCRIPTION

Figure 1A:
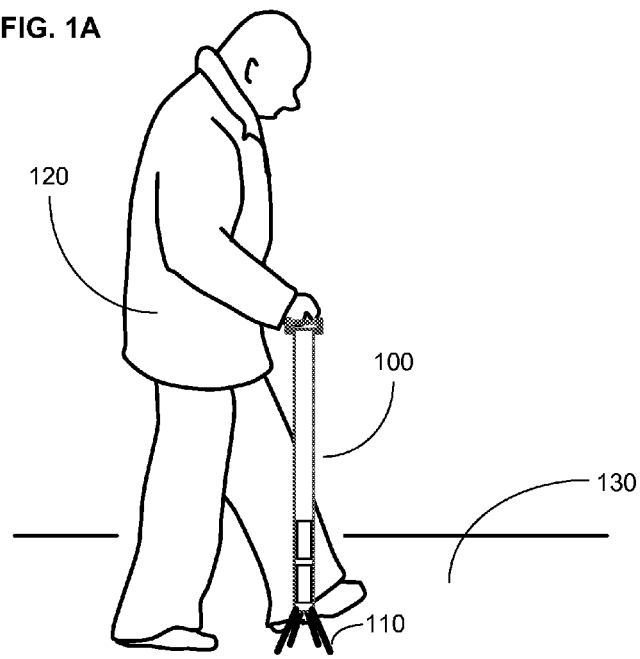
FIG. 1A is a schematic of a walking aid and a user on a flat walking surface.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Described herein are walking aids configured to help a user walk on a walking surface. More specifically, described herein are walking aides including extendable and retractable self-leveling load-bearing feet for stabilizing a walking aid and a user while walking on an uneven walking surface.

Figure 1B:
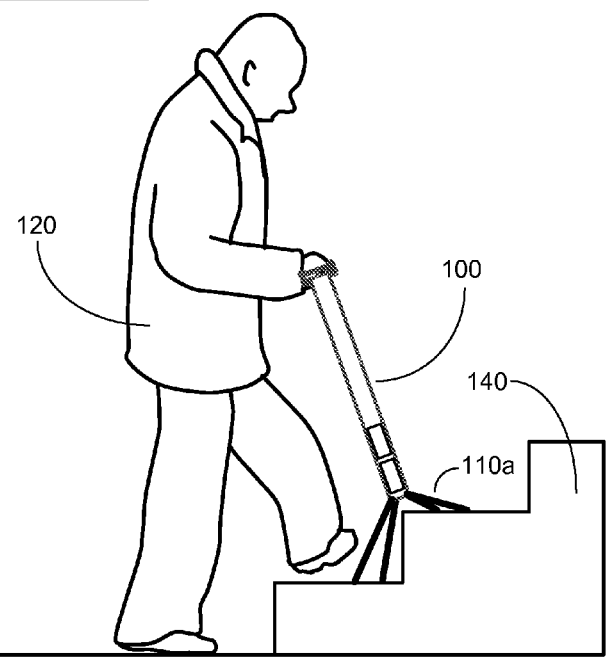
FIG. 1B is a schematic of a walking aid and a user on a stepped walking surface.

With reference to FIGS. 1A and 1B, shown is an example of a walking aid which can serve as a context for one or more devices, systems, and/or methods described herein. FIG. 1A shows a walking aid 100 including two or more extendable and retractable self-leveling load-bearing feet 110. Walking aid 100 is shown in use by user 120 on a flat walking surface 130. FIG. 1B shows user 120 using walking aid 100 on a stepped walking surface 140. In this non-limiting example, the two or more extendable retractable self-leveling load-bearing feet 110a are individually extended or retracted as needed to aid and stabilize the user 120 while climbing the stepped walking surface 140.

A walking aid such as described herein is configured for use on a variety of walking surfaces. In an aspect, the walking surface includes a sidewalk, a street, a dedicated walking path, a cobble stone or brick path, a dirt path, a grassy path, or a rocky path. In an aspect, the walking surface is uneven. For example, the walking surface can include an asphalt street including "pot holes". For example, the walking surface can include a concrete sidewalk or dedicated walking path with buckled, broken, or uneven segments of concrete. For example, the walking surface can include a hiking trail with inclines and declines, rocks or boulders, tree roots, or other obstacles creating an uneven walking surface. In an aspect, the walking surface includes a slope, e.g., an incline or a decline. In an aspect, the walking surface includes a walking surface in a home or other building. In an aspect, the walking surface in a home or other building includes a carpeted walking surface, a hardwood floor walking surface, a laminate or linoleum walking surface, a tiled walking surface, or a stepped walking surface (e.g., a staircase). In an aspect, the walking surface includes a ramp with an inclined or declined slope. In an aspect, the walking surface includes a moving waking surface, e.g., a moving sidewalk or an escalator.

FIGS. 2A and 2B illustrate further aspects of a walking aid. FIG. 2A shows a schematic of walking aid 200 on walking surface 280, e.g., a relatively flat walking surface. Walking aid 200 includes a linear rod 210 having a first end 220 and a second end 230 and hand grip 240 disposed in proximity to the first end 220 of linear rod 210. Walking aid 200 further includes two or more extendable and retractable self-leveling load-bearing feet 250 at the second end 230 of linear rod 210. Walking aid 200 includes at least one sensor 260 configured to detect a parameter of a walking surface 280 in proximity to the second end 230 of linear rod 210. Walking aid 200 includes a controller 270 including a microprocessor 272 and circuitry 274. Controller 270 is operably coupled to the two or more extendable and retractable self-leveling load-bearing feet 250 and the at least one sensor 260. Controller 270 includes circuitry configured to receive information regarding the detected parameter of the walking surface 280 from the at least one sensor 260 and circuitry configured to actuate at least one of the two or more extendable and retractable self-leveling load-bearing feet 250 in response to the information regarding the detected parameter of the walking surface 280.

FIG. 2B shows a schematic of walking aid 200 on walking surface 290, e.g., an uneven walking surface. Walking aid 200 includes linear rod 210 and hand grip 240. Walking aid 200 further includes two or more extendable and retractable self-leveling load-bearing feet 250a which have been individually extended or retracted to accommodate the uneven surface represented by walking surface 290. Walking aid 200 includes at least one sensor 260 configured to detect a parameter, e.g., an unevenness, of walking surface 290 and controller 270 includes circuitry configured to receive information regarding the detected parameter of walking surface 290 from the at least one sensor 260 and circuitry configured to actuate at least one of the two or more extendable and retractable self-leveling load-bearing feet 250a in response to the information regarding the detected parameter of walking surface 290.

A walking aid such as described herein includes a linear rod. The linear rod provides the main structural support or shaft for the walking aid. The first end of the linear rod serves as a connection point for a hand grip. The second end of the linear rod serves as a connection point for the two or more extendable and retractable self-leveling load-bearing feet. In an aspect, the linear rod provides an attachment point for the at least one sensor and the controller. In some embodiments, the linear rod provides an attachment point for one or more additional components of the walking aid. For example, the linear rod can provide an attachment point for a user-activated control mechanism, a user interface, at least one second sensor, an actuator, a mechanical energy harvester, a power source, and/or a warning system.

In an aspect, the linear rod comprises a cylindrical rod that is circular in transverse cross-section. Alternatively, the linear rod may have a non-circular transverse cross-section. For example, the linear rod can be oval, square, triangular, or polygonal in transverse cross-section. In an aspect, the diameter or width of the linear rod is about 0.5 inches to about 3.0 inches. For example, the diameter or width of the linear rod can be 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, or 3.0 inches. A linear rod with a greater or lesser diameter or width is contemplated and may depend upon the composition and/or configuration of the linear rod.

In an aspect, the linear rod is about 12 inches to about 50 inches in length. For example, the linear rod can be 12 inches, 12.5 inches, 13 inches, 13.5 inches, 14 inches, 14.5 inches, 15 inches, 15.5 inches, 16 inches, 16.5 inches, 17 inches, 17.5 inches, 18 inches, 18.5 inches, 19 inches, 19.5 inches, 20 inches, 20.5 inches, 21 inches, 21.5 inches, 22 inches, 22.5 inches, 23 inches, 23.5 inches, 24 inches, 24.5 inches, 25 inches, 25.5 inches, 26 inches, 26.5 inches, 27 inches, 27.5 inches, 28 inches, 28.5 inches, 29 inches, 29.5 inches, 30 inches, 30.5 inches, 31 inches, 31.5 inches, 32 inches, 32.5 inches, 33 inches, 33.5 inches, 34 inches, 34.5 inches, 35 inches, 35.5 inches, 36 inches, 36.5 inches, 37 inches, 37.5 inches, 38 inches, 38.5 inches, 39 inches, 39.5 inches, 40 inches, 40.5 inches, 41 inches, 41.5 inches, 42 inches, 42.5 inches, 43 inches, 43.5 inches, 44 inches, 44.5 inches, 45 inches, 45.5 inches, 46 inches, 46.5 inches, 47 inches, 47.5 inches, 48 inches, 48.5 inches, 49 inches, 49.5 inches, or 50 inches in length. The length of the linear rod can be longer or shorter depending upon the overall desired length of the walking aid, e.g., the combined length of the hand grip, the linear rod, and the two or more extendable and retractable self-leveling load-bearing feet. In an aspect, the length of the linear rod is adjustable. For example, the linear rod can include two or more telescoping segments with twistable locks to adjust and fix the length of the linear rod.

In an aspect, the linear rod is a solid linear rod. In an aspect, the hand grip, the two or more extendable and retractable self-leveling load-bearing feet, the at least one sensor, and the controller are attached to an outer surface of a solid linear rod. In an aspect, at least a portion of the linear rod is hollow. For example, at least a portion of the linear rod forms a hollow tube. In an aspect, at least a portion of the two or more extendable and retractable self-leveling load-bearing feet, the at least one sensor, and the controller are disposed within an interior portion of the linear rod.

Preferably the linear rod is formed from a lightweight but sturdy, weight-bearing material. In an aspect, the linear rod is formed from a metal or metal alloy. For example, the linear rod can be formed from aluminum or an aluminum alloy. For example, the linear rod can be formed from stainless steel. For example, the linear rod can be formed from titanium or a titanium alloy. In an aspect, the linear rod is formed from a plastic or polymer material. In an aspect, the linear rod is formed from carbon fiber or a carbon fiber composite. For example, the linear rod can be formed from carbon fiber-reinforced polymer or plastic. For example, the linear rod can be formed from a carbon fiber-epoxy resin composite or a carbon fiber-polyester, -vinyl ester, or -nylon composite. In an aspect, the linear rod is formed from a composite material including aramid, aluminum, ultra-high-molecular-weight polyethylene, or fiber glass. In an aspect, the linear rod is formed from wood, e.g., ash or beech wood.

A walking aid such as described herein includes a hand grip disposed in proximity to the first end of the linear rod. The hand grip is configured for gripping by a hand or hands of a user. In an aspect, the hand grip is disposed at the extreme end of the linear rod. For example, the hand grip can be attached to the top of the linear rod. In an aspect, the hand grip is a curved continuation of the linear rod. For example, the linear rod can include a curved portion at the first end that forms a hand grip. In an aspect, the hand grip is disposed in a region proximal to the first end of the linear rod. For example, the hand grip may be attached to the side of the linear rod in a region proximal to the first end of the linear rod, extended out from the linear rod like a handle. In an aspect, the hand grip is smooth. In an aspect, the hand grip is contoured to accommodate the fingers of a gripping hand. For example, the hand grip can include an ergonomically compatible grip. For example, the hand grip can include a contoured gel grip. In an aspect, the hand grip is formed from the same material used to form the linear rod. In an aspect, the hand grip is a contiguous part of the linear rod. In an aspect, the hand grip is formed separately and subsequently attached to the linear rod. In an aspect, the hand grip is formed from a different material from that used to form the linear rod. In an aspect, the hand grip is formed from a metal or metal alloy, e.g., aluminum, stainless steel, titanium, brass, or silver. In an aspect, the hand grip is formed from plastic, e.g., polyvinylchloride. In an aspect, the hand grip is formed from foam, e.g., polyurethane foam rubber or latex foam rubber. In an aspect, the hand grip is formed from rubber. In an aspect, the hand grip is formed from wood or from cork.

In an aspect, the hand grip includes a user interface. For example, the hand grip can include a user interface that allows a user to control one or more functions of the walking aid. In an aspect, the user interface includes one or more of buttons, switches, touchpads, triggers, or the like. In an aspect, the user interface includes at least one of a microphone, a speaker, a light, or a haptic device. In some embodiments, the user interface is part of a user-activated control mechanism to control extension and retraction of the two or more extendable and retractable self-leveling load-bearing feet. For example, one or more buttons on the hand grip can be used to manually control extension and retraction of the two or more extendable and retractable self-leveling load-bearing feet. In some embodiments, the user interface is part of a warning system operably coupled to the controller and configured to alert a user. For example, a light emitting diode on the hand grip can be used to alert a user to a hazard associated with the walking surface, e.g., a crack in a sidewalk or the edge of a curb.

In an aspect, a walking aid includes two or more extendable and retractable self-leveling load-bearing feet. In an aspect, a walking aide includes two to ten extendable and retractable self-leveling load-bearing feet. For example, a walking aid can include two, three, four, five, six, seven, eight, nine, or ten extendable and retractable self-leveling load-bearing feet. In an aspect, each of the two or more extendable and retractable self-leveling load-bearing feet is about 2 inches to about 24 inches in length. For example, at least one of the two or more extendable and retractable self-leveling load-bearing feet is 2 inches, 2.5 inches, 3 inches, 3.5 inches, 4 inches, 4.5 inches, 5 inches, 5.5 inches, 6 inches, 6.5 inches, 7 inches, 7.5 inches, 8 inches, 8.5 inches, 9 inches, 9.5 inches, 10 inches, 10.5 inches, 11 inches, 11.5 inches, 12 inches, 12.5 inches, 13 inches, 13.5 inches, 14 inches, 14.5 inches, 15 inches, 15.5 inches, 16 inches, 16.5 inches, 17 inches, 17.5 inches, 18 inches, 18.5 inches, 19 inches, 19.5 inches, 20 inches, 20.5 inches, 21 inches, 21.5 inches, 22 inches, 22.5 inches, 23 inches, 23.5 inches, or 24 inches in length. The length of each of the extendable and retractable self-leveling load-bearing feet can be longer or shorter depending upon the overall desired length of the walking aid, e.g., the combined length of the hand grip, the linear rod, and the two or more extendable and retractable self-leveling load-bearing feet.

In an aspect, at least one of the two or more extendable and retractable self-leveling load-bearing feet is circular in transverse cross-section. Alternatively, at least one of the two or more extendable and retractable self-leveling load-bearing feet may include a non-circular transverse cross-section. For example, at least one of the two or more extendable and retractable self-leveling load-bearing feet can be oval, square, triangular, or polygonal in transverse cross-section. In an aspect, the diameter or width of at least one of the two or more extendable and retractable self-leveling load-bearing feet is about 0.2 inches to about 3.0 inches. For example, the diameter or width of at least one of the two or more extendable and retractable self-leveling load-bearing feet can be 0.2 inches, 0.3 inches, 0.4 inches, 0.5 inches, 0.6 inches, 0.7 inches, 0.8 inches, 0.9 inches, 1.0 inches, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, or 3.0 inches. An extendable and retractable self-leveling load-bearing foot with a larger or smaller diameter or width is contemplated and may depend upon the composition and/or configuration of the extendable and retractable self-leveling load-bearing foot.

Preferably, the two or more extendable and retractable self-leveling load-bearing feet are formed from a lightweight but sturdy material, e.g., a material capable of load-bearing. In an aspect, the two or more extendable and retractable self-leveling load-bearing feet are formed from a metal or metal alloy. For example, the two or more extendable and retractable self-leveling load-bearing feet can be formed from aluminum or titanium or alloys thereof. For example, the two or more extendable and retractable self-leveling load-bearing feet can be formed from stainless steel. In an aspect, the extendable and retractable self-leveling load-bearing feet are formed from a plastic or polymer material. In an aspect, the two or more extendable and retractable self-leveling load-bearing feet are formed from carbon fiber or a carbon fiber composite. For example, the two or more extendable and retractable self-leveling load-bearing feet can be formed from carbon fiber-reinforced polymer or plastic. For example, the two or more extendable and retractable self-leveling load-bearing feet can be formed from a carbon fiber-epoxy resin composite or a carbon fiber-polyester, -vinyl ester, or -nylon composite. In an aspect, the two or more extendable and retractable self-leveling load-bearing feet are formed from a composite material including aramid, aluminum, ultra-high-molecular-weight polyethylene, or fiber glass. In an aspect, the two or more extendable and retractable self-leveling load-bearing feet are formed from wood, e.g., ash or beechwood.

In an aspect, a walking aid includes two or more extendable and retractable self-leveling load-bearing feet wherein at least one of the two or more extendable and retractable self-leveling load-bearing feet has two or more telescoping segments. FIGS. 3A and 3B illustrate aspects of extendable and retractable self-leveling load-bearing feet with two or more telescoping segments. FIG. 3A shows an example of a single extendable and retractable self-leveling load-bearing foot 300a in a retracted configuration. Extendable and retractable self-leveling foot 300a includes telescoping segments 304a, 304b, and 304c. Telescoping segment 304c is shown at least partially disposed within telescoping segment 304b, and telescoping segment 304b is shown at least partially disposed within telescoping segment 304a. FIG. 3B shows extendable and retractable self-leveling foot 300b in an extended configuration. In the extended configuration, telescoping segments 304a, 304b, and 304c have been extended relative to one another.

In an aspect, an extendable and retractable self-leveling load-bearing foot can include two telescoping segments. For example, an extendable and retractable self-leveling load-bearing foot can include a first segment configured to slide into or out of an interior portion of an adjacent second segment to adjust the overall length of the foot. In an aspect, an extendable and retractable self-leveling load-bearing foot can include three or more telescoping segments. In an aspect, at least one of the telescoping segments is a hollow tube of a load-bearing metal or metal alloy. For example, at least one of the telescoping segments can be a hollow tube of aluminum, titanium, or alloys thereof. In an aspect, at least one of the telescoping segments is a hollow tube of load-bearing plastic or polymer. For example, at least one of the telescoping segments can be a hollow tube of carbon fiber-epoxy resin composite.

In an aspect, at least one of the two or more extendable and retractable self-leveling load-bearing feet has a pivot at a connection to the linear rod and two or more telescoping segments. In an aspect, at least one of the two or more extendable and retractable self-leveling load-bearing feet is rotatable. For example at least one of the two or more extendable and retractable feet can be rotatable around a pivot at a connection to the linear rod. FIGS. 3C and 3D illustrate aspects of extendable and retractable self-leveling load-bearing feet including a pivot at a connection to the linear rod and two or more telescoping segments. FIG. 3C shows a single extendable and retractable self-leveling load-bearing foot 305a in a retracted configuration and pivot 302 for connecting the extendable and retractable self-leveling load-bearing foot to a portion of a linear rod. Extendable and retractable self-leveling load-bearing foot 305a is able to rotate relative to the linear rod around pivot 302. Extendable and retractable self-leveling foot 305a includes telescoping segments 304a, 304b, and 304c. Telescoping segment 304c is shown at least partially disposed within telescoping segment 304b, and telescoping segment 304b is shown at least partially disposed within telescoping segment 304a. FIG. 3D shows extendable and retractable self-leveling foot 305b in an extended configuration. In the extended configuration, telescoping segments 304a, 304b, and 304c have been extended relative to one another.

FIGS. 3E-3G illustrate aspects of a walking aid including extendable and retractable self-leveling load-bearing feet having a pivot at a connection to the linear rod and two or more telescoping segments. FIG. 3E shows walking aid 310 on walking surface 330. Walking aid 310 includes linear rod 312 having a first end and a second end, hand grip 314 disposed in proximity to the first end of linear rod 312, two or more extendable and retractable self-leveling load-bearing feet 320a at the second end of linear rod 312, the two or more extendable and retractable self-leveling load-bearing feet 320a having a pivot 302 at a connection to the linear rod 312 and two or more telescoping segments 304, at least one sensor 316 configured to detect a parameter of walking surface 330 in proximity to the second end of linear rod 312, and a controller 318 including a microprocessor and circuitry and operably coupled to the two or more extendable and retractable self-leveling load-bearing feet 320a and the at least one sensor 316, controller 318 configured to receive information regarding the detected parameter of walking surface 330 from the at least one sensor 316 and configured to actuate at least one of the two or more extendable and retractable self-leveling load-bearing feet 320a in response to the information regarding the detected parameter of walking surface 330.

FIG. 3F shows walking aid 310 on walking surface 340. Walking surface 340 represents an uneven walking surface. In this non-limiting example, the two or more extendable and retractable self-leveling load-bearing feet 320a of FIG. 3E have been extended or retracted by pivoting around pivot 302 and/or telescoping segments 304 represented by two or more extendable and retractable self-leveling load-bearing feet 320b. The extension and retraction around pivot points 302 or telescoping of segments 304 is based on the information regarding a detected parameter, e.g., unevenness, of walking surface 340. FIG. 3G shows walking aid 310 on walking surface 350. Walking surface 350 represents a stepped walking surface. In this non-limiting example, the two or more extendable and retractable self-leveling load-bearing feet 320a of FIG. 3E have been extended or retracted by pivoting around pivot 302 and/or telescoping segments 304 represented by two or more extendable and retractable self-leveling load-bearing feet 320c. The extension and refraction around pivot points 302 or telescoping of segments 304 is based on the information regarding a detected parameter, e.g., stepped, of walking surface 350.

In some embodiments, at least one of the two or more extendable and retractable self-leveling load-bearing feet has a pivot at a connection to the linear rod and one or more additional pivots along a length of the at least one of the two or more extendable and retractable self-leveling load-bearing feet. FIGS. 4A-4C illustrate non-limiting examples of an extendable and retractable self-leveling load-bearing foot with one or more pivot points. FIG. 4A shows extendable and retractable self-leveling load-bearing foot 400 including two segments 404 connected by a pivot 406. In this non-limiting example, the extendable and retractable self-leveling load-bearing foot has a non-pivoting connection to a portion of the linear rod and a single pivot point between the two segments. FIG. 4B shows extendable and retractable self-leveling load-bearing foot 410 including two segments 404 connected by a pivot 406. An additional pivot 408 can be used to connect extendable and retractable self-leveling load-bearing foot 410 to a portion of the linear rod. In this non-limiting example, the extendable and retractable self-leveling load-bearing foot has two pivot points. FIG. 4C shows extendable and retractable self-leveling load-bearing foot 420 including three segments 404 attached to one another in a series through pivots 406. An additional pivot 408 can be used to connect extendable and retractable self-leveling load-bearing foot 400 to a portion of the linear rod. In this non-limiting example, the extendable and retractable self-leveling load-bearing foot 420 includes three pivot points.

In some embodiments, at least one of the two or more extendable and retractable self-leveling load-bearing feet includes an additional foot pad at the distal end of the at least one of the two or more extendable and retractable self-leveling load-bearing feet. For example, the foot pad can include a rubber pad or cup attached to the distal end of the extendable and retractable self-leveling load-bearing foot. For example, a rubber pad or cup can be added to prevent slippage of the extendable and retractable self-leveling load-bearing feet on a slick walking surface. In an aspect, the foot pad includes a pivot connection to the extendable and retractable self-leveling load-bearing foot. For example, the foot pad can include a pivot connection that allows it to pivot relative to movement of the extendable and retractable self-leveling load-bearing foot to which it is attached. FIG. 4D shows extendable and retractable self-leveling load-bearing foot 430 including foot pad 425. Extendable and retractable self-leveling load-bearing foot 430 includes two segments 404 connected by pivot 406. Extendable and retractable self-leveling load-bearing foot 430 is configured for attached to a portion of a linear rod through another pivot 408. Similarly, foot pad 425 is connected to segment 404 at the distal end of extendable and retractable self-leveling load-bearing foot 430 through a third pivot 406.

FIGS. 4E-4G illustrate aspects of a walking aid including extendable and retractable self-leveling load-bearing feet having a pivot at a connection to the linear rod and one or more additional pivots along the length of the at least one of the two or more extendable and retractable self-leveling load-bearing feet. FIG. 4E shows walking aid 430 on walking surface 450. Walking aid 430 includes linear rod 402 having a first end and a second end, hand grip 432 disposed in proximity to the first end of linear rod 402, two or more extendable and retractable self-leveling load-bearing feet 440a at the second end of linear rod 402, the two or more extendable and retractable self-leveling load-bearing feet 440a having a pivot 408 at a connection to the linear rod 402 and an additional pivot 406 along the length of the two or more extendable and retractable self-leveling load-bearing feet 440a, at least one sensor 434 configured to detect a parameter of walking surface 450 in proximity to the second end of linear rod 402, and a controller 436 including a microprocessor and circuitry and operably coupled to the two or more extendable and retractable self-leveling load-bearing feet 440a and the at least one sensor 434, controller 436 including circuitry configured to receive information regarding the detected parameter of walking surface 450 from the at least one sensor 434 and circuitry configured to actuate at least one of the two or more extendable and retractable self-leveling load-bearing feet 440a in response to the information regarding the detected parameter of walking surface 450.

FIG. 4F shows walking aid 430 on walking surface 460. Walking surface 460 represents an uneven walking surface. In this non-limiting example, the two or more extendable and retractable self-leveling load-bearing feet 440a of FIG. 4E have been extended or retracted around pivot points 406 and 408 represented by two or more extendable and retractable self-leveling load-bearing feet 440b. The extension and retraction around pivot points 406 and 408 is based on the information regarding a detected parameter, e.g., unevenness, of walking surface 460. FIG. 4G shows walking aid 430 on walking surface 470. Walking surface 470 represents a stepped walking surface. In this non-limiting example, the two or more extendable and retractable self-leveling load-bearing feet 440*a* of FIG. 4E have been extended or retracted around pivot points 406 and 408 represented by two or more extendable and retractable self-leveling load-bearing feet 440*c*. The extension and retraction around pivot points 406 and 408 is based on the information regarding a detected parameter, e.g., stepped, of walking surface 470.

In some embodiments, the two or more extendable and retractable self-leveling load-bearing feet are operable to make the walking aid free-standing. For example, the two or more extendable and retractable self-leveling load-bearing feet are operable to be moved into a position relative to one another that provides a stable platform for holding the walking aid in a near vertical position. In an aspect, a walking aid includes two or more extendable and retractable self-leveling load-bearing feet including two or more telescoping segments operable to make the walking aid free-standing. In an aspect, a walking aid includes two or more extendable and retractable self-leveling load-bearing feet including a pivot connection to a linear rod and two or more telescoping segments operable to make the walking aid free-standing. In an aspect, a walking aid includes two or more extendable and retractable self-leveling load-bearing feet including a pivot connection to a linear rod and one or more additional pivots along the length of the two or more extendable and retractable self-leveling load-bearing feet and operably to make the walking aid free-standing.

In some embodiments, at least one of the two or more expendable and retractable self-leveling load-bearing feet is configured to retract for storage into an interior portion of the linear rod. FIGS. 5A-5C illustrate a non-limiting example of a walking aid including expendable and retractable self-leveling load-bearing feet retracted for storage into an interior portion of the linear rod of the walking aid. In FIG. 5A, walking aid 500 includes linear rod 510, two or more expendable and retractable self-leveling load-bearing feet 520, and hand grip 530. The two or more extendable and retractable self-leveling load-bearing feet 520 are shown retracted for storage within an interior portion 540 (dashed outline) constituting a compartment or hollow space inside a portion of the linear rod. In FIG. 5B, shows walking aid 500 with the two or more extendable and retractable self-leveling load-bearing feet 520 pushed out of the interior portion 540 of the linear rod 510. For example, the two or more extendable and retractable self-leveling load-bearing feet can be attached at one end to a motor including pistons and/or pulleys that are capable of pushing and pulling the two or more extendable and retractable self-leveling load-bearing feet out of and into the interior portion of the linear rod. In FIG. 5C, shows walking aid 500 with the two or more extendable and retractable self-leveling load-bearing feet 520 fully extended from the interior portion 540 of the linear rod 510 and pivoted to provide support on a walking surface. In some embodiments, a user-activated control mechanism associated with hand grip 530, e.g., a button or switch, is used to initiate pushing or pulling of the two or more extendable and retractable self-leveling load-bearing feet 520 into or out of the interior portion 540 of linear rod 510.

In some embodiments, at least one of the two or more expendable and retractable self-leveling load-bearing feet is configured to retract for storage on a side of the linear rod. FIGS. 6A and 6B illustrate a non-limiting example of a walking aid including expendable and retractable self-leveling load-bearing feet retracted for storage on a side of the walking aid. In FIG. 6A, walking aid 600 includes linear rod 610, two or more extendable and retractable self-leveling load-bearing feet 620, and hand grip 630. The two or more extendable and retractable self-leveling load-bearing feet 620 are shown retracted or folded up for storage along the outer surface of the linear rod 610. In FIG. 6B, walking aid 600 is shown with the two or more extendable and retractable self-leveling load-bearing feet 620 pivoted or unfolded outward from the outer surface of the linear rod 610 and ready for contact with a walking surface. In some embodiments, a user-activated control mechanism associated with hand grip 630, e.g., a button, is used to initiate pivoting or unfolding of the two or more extendable and retractable self-leveling load-bearing feet 620.

FIG. 7 illustrates further aspects of a walking aid such as shown in FIG. 2A. Walking aid 200 includes at least one sensor 260 configured to detect a parameter of a walking surface in proximity to the second end of the linear rod. In an aspect, the parameter of the walking surface includes at least one of a surface type, a friction coefficient, a roughness, a slope, an edge, a height, a distance, or a bump.

In an aspect, the at least one sensor 260 is incorporated into an interior portion of linear rod 210. For example, an accelerometer, tilt sensor, or inclinometer can be incorporated into an interior portion of the linear rod. In an aspect, at least one sensor 260 is incorporated onto an outer surface of linear rod 210. For example, a camera or proximity sensor can be attached to an outer surface of the linear rod. In an aspect, at least one sensor 260 is incorporated into hand grip 240. In some embodiments, at least one sensor 260 is associated with at least one of the two or more extendable and retractable self-leveling load-bearing feet 250. For example, that portion of an extendable and retractable self-leveling load-bearing foot that makes contact with the walking surface can include one or more sensors, e.g., one or more pressure sensors.

In an aspect, the at least one sensor 260 comprises a tactile sensor 700. In an aspect, tactile sensor 700 is configured to detect a parameter of a walking surface in proximity to the second end of the linear rod. In an aspect, the tactile sensor is configured to assess the hardness (e.g., concrete or asphalt) or softness (deep sand or grass) of the walking surface. In an aspect, the tactile sensor 700 includes a pressure sensor. For example, the tactile sensor can include a pressure sensor array, for determining weight, texture, stiffness, center of mass, and/or coefficient of friction. In an aspect, the tactile sensor can include a force gauge or force sensor. In an aspect, the tactile sensor includes an array of strain gauges. In an aspect, the tactile sensor can include a piezoresistive, a piezoelectric, capacitive, an optical sensor, an ultrasonics-based sensor, a magnetism-based sensor, or elastoresistive tactile sensor. See, e.g., Dahiya et al. (2009) "Tactile Sensing—From Humans to Humanoids" IEEE Transactions on Robotics, 26:1-20, which is incorporated herein by reference. In an aspect, the tactile sensor is configured to detect slippage and friction coefficient. See, e.g., Chuang et al. (2012) "Detection system of incident slippage and friction coefficient based on a flexible tactile sensor with structural electrodes" Sensors and Actuators A 188:48-55; and Nakamura & Shinoda (2001) "A tactile sensor instantaneously evaluating friction coefficients" The 11$^{th}$ International Conference on Sold-State Sensors and Actuators, Munich, Germany, Jun. 10-14, 2001, pp. 1430-1433, which are incorporated herein by reference.

In an aspect, the at least one sensor 260 comprises at least one of a tilt sensor 705 or an inclinometer 710. In an aspect, the at least one of a tilt sensor 705 or an inclinometer 710 is configured to detect a parameter of a walking surface in proximity to the second end of the linear rod. In an aspect, the tilt sensor or the inclinometer includes at least one of a tilt meter, a tilt indicator, a slope alert, a slope gauge, a gradient meter, a gradiometer, a level gauge, a declinometer, and a pitch and roll indicator. In an aspect, the inclinometer measures incline (positive slope as observed by user) or decline (negative slope as observed by user). For example, a tilt sensor or inclinometer can be used to indicate a slope, either positive or negative, in proximity to the walking aid. In some embodiments, the tilt sensor or inclinometer measures changes in a parameter of the walking aid, e.g., tilt or inclination, relative to the walking surface. In an aspect, the tilt sensor or inclinometer measures pitch and roll of the walking aid. In an aspect, a tilt sensor or an inclinometer includes a three-axis accelerometer. Tilt sensors and inclinometers are available from commercial sources (from, e.g., Trossen Robotics, Downers Grove, Ill.; Dimension Engineering, Akron, Ohio).

In an aspect, the at least one sensor 260 comprises a texture sensor 715. In an aspect, texture sensor 715 is configured to detect a parameter of a walking surface in proximity to the second end of the linear rod. For example, the texture sensor can be configured to detect a texture, e.g., rough or smooth, of the walking surface. In an aspect, the texture sensor is configured to detect light reflected off the surface of the walking surface. For example, a shiny surface should reflect light at an angle equal to the angle of incidence of the surface relative to a plane tangent to the point of incidence. In contrast, a rough or matte surface scatters incident light. In an aspect, the texture sensor includes a light source, e.g, a laser, and photoreceptors configured to detect the reflected light. In an aspect, the texture sensor is incorporated into a distal end of the extendable and retractable self-leveling load-bearing feet and in physical contact with the walking surface. See, e.g., Ye et al. (2007) "Pen-type Sensor for Surface Texture Perception" 16$^{th}$ IEEE International Conference on Robot & Human Interactive Communication, Aug. 26-29, 2007, Jeju, Korea, which is incorporated herein by reference. In an aspect, the texture sensor includes a tactile sensor array. See, e.g., Jamali et al. (2009) "Texture Recognition by Tactile Sensing" Australasian Conference on Robotics and Automation (ACRA), Dec. 2-4, 2009, Sydney, Australia, which is incorporated herein by reference.

In an aspect, the at least one sensor 260 comprises at least one of an accelerometer 725 or a gyroscope 720. In an aspect, at least one of accelerometer 725 or gyroscope 720 are configured to detect a parameter of a walking surface in proximity to the second end of the linear rod. In an aspect, the accelerometer senses acceleration of the walking aid in one, two, or three axes. For example, the accelerometer can include a three-axis sensor for measuring accelerations on three accelerometer axes. The signal from an accelerometer sensor can be separated into two signals: the acceleration from gravity, and external acceleration. The acceleration from gravity allows measurement of the tilt of the sensor by identifying which direction is "down." In an aspect, the accelerometer includes a proof mass-spring system. In an aspect, the accelerometer is a piezoelectric accelerometer, a piezoresistive accelerometer, or a capacitive accelerometer. Accelerometers and/or gyroscopes are available from commercial sources (from, e.g., Meggit Sensing Systems, Irvine, Calif.; Trossen Robotics, Downers Grove, Ill.; Dimension Engineering, Akron, Ohio; Freescale Semiconductor Inc., Austin, Tex.).

In an aspect, accelerometer 725 is configured to detect height differences between successive contacts of a portion of the walking aid with the walking surface. For example, one or more accelerometers can be used to indicate successive increases in the height of the walking aid between successive contacts with a stepped walking surface. In an aspect, accelerometer 725 is configured to be located on a user. For example, an accelerometer on the user can provide information regarding the progress of the user in a forward, backward, or lateral direction.

In an aspect, the at least one sensor 260 comprises at least one camera 730. In an aspect, at least one camera 730 is configured to detect a parameter of a walking surface in proximity to the second end of the linear rod. For example, the at least one camera can include a digital camera configured to capture one or more images of the walking surface in proximity to the second end of the linear rod. In an aspect, the at least one camera includes a camera module including a CMOS or CCD image sensor. Digital camera modules are available from commercial sources (from, e.g., e-con Systems, Inc., St. Louis, Mo.; STMicroelectronics, Geneva, Switzerland).

In an aspect, the at least one sensor 260 comprises at least one whisker sensor 735. In an aspect, the at least one whisker sensor 735 is configured to detect a parameter of the walking surface in proximity to the second end of the linear rod. For example, the whisker sensor can include one or more flexible wires attached to the second end of the linear rod of the walking aid, wherein movement of the one or more flexible wires in response to touching an object on the walking surface, e.g., an edge of an uneven walkway, is detected. In an aspect, the at least one whisker sensor is attached to one of the two or more extendable and retractable self-leveling load-bearing feet. See, e.g., Wijaya & Russell (2002) "Object Exploration using Whisker Sensors" Proc. 2002 Australasian Conference on Robotics and Automation, Auckland, 27-29 Nov. 2002, pp. 180-185, which is incorporated herein by reference.

In an aspect, the at least one sensor 260 comprises at least one proximity sensor 740. In an aspect, the at least one proximity sensor 740 is configured to detect a parameter of the walking surface in proximity to the second end of the linear rod. For example, the walking aid can include at least one proximity sensor to sense or detect how close a portion of the walking surface is to a portion of the walking aid. In an aspect, the at least one proximity sensor comprises at least one of a photoelectric proximity sensor, an acoustic proximity sensor, or a capacitive proximity sensor. In an aspect, the at least one proximity sensor includes at least one of an inductive proximity sensor, long range proximity sensor, ultrasonic proximity sensor, infrared (IR) proximity sensor, 3gs proximity sensor, RFID proximity sensor, laser proximity sensor, wireless proximity sensor, proximity sensor alarm, micro proximity sensor, or microwave proximity sensor. In an aspect, the proximity sensor includes at least one camera configured to capture images in proximity to the walking aid. Proximity sensors are available from a variety of commercial sources (from, e.g., ZF Electronics Corp., Pleasant Prairie, Wis.; Freescale Semiconductor Inc., Austin, Tex.; Semtech, Camarillo, Calif.; STMicroelectronics, Geneva, Switzerland).

In an aspect, the at least one sensor 260 comprises at least one pressure sensor 745. In an aspect, the at least one pressure sensor 745 is configured to detect a parameter of a walking surface in proximity to the second end of the linear rod. In an aspect, the at least one pressure sensor includes a capacitive pressure sensor. For example, the pressure sensor can include a two metal plates separated by a nonconductive foam to form a capacitive transducer that when connected to an inductor results in an inductance-capacitance combination with a specific frequency of oscillation. Applying pressure to the sensor alters the distance between the metal places, lowers the oscillator frequency, and increases the capacitance. In an aspect, the at least one pressure sensor includes an elastomer pressure sensor. For example, the pressure sensor can include a compressible foam pad with electrodes on one side receiving a positive voltage and mated pairs of electrodes on the other side receiving a negative voltage. Compression of the pad reduces the resistance between the electrode pairs and increase in current. Pressure sensors are commercially available from a variety of sources (from, e.g., Trossen Robotics, Downers Grove, Ill.; Freescale Semiconductor Inc., Austin, Tex.).

Returning to FIG. 7, walking aid 200 includes a controller 270 including a microprocessor 272 and circuitry 274. Controller 270 is operably coupled to the two or more extendable and retractable self-leveling load-bearing feet 250 and the at least one sensor 260 and includes circuitry configured to (e.g., includes at least one of software or a processor programed to) receive information regarding the detected parameter of the walking surface from the at least one sensor 260 and circuitry configured to actuate at least one of the two or more extendable and retractable self-leveling load-bearing feet 250 in response to the information regarding the detected parameter of the walking surface.

In an aspect, controller 270 includes a microprocessor 272. In an aspect, microprocessor 272 includes a central processing unit for controlling one or more functions of the walking aid. The controller further includes a system memory and a system bus that couples various system components including the system memory to the microprocessor. The microprocessor can include a processing unit, a central processing unit (CPU), a digital signal processor (DSP), an application-specific integrated circuit (ASIC), a field programmable gate entry (FPGA), or the like, or any combinations thereof, and can include discrete digital or analog circuit elements or electronics, or combinations thereof. In an aspect, the controller includes one or more ASICs having a plurality of pre-defined logic components. In an aspect, the controller includes one or more FPGA having a plurality of programmable logic commands.

Controller 270 further includes circuitry 274. In an aspect, circuitry 274 includes circuitry configured to execute one or more instructions for operating components of the walking aid, e.g., the at least one sensor and the two or more extendable and retractable self-leveling load-bearing feet. In an aspect, circuitry 274 includes circuitry configured to execute one or more instructions for operating any or all other components incorporated into the walking aid, e.g., a user-activated control mechanism, a user interface, at least one second sensor, an actuator, a power source, a mechanical energy harvester, and/or a warning system. In an aspect, the controller includes circuitry to execute one or more instructions for receiving information regarding the detected parameter of the walking surface from the at least one sensor and circuitry to execute one or more instructions for actuating at least one of the two or more extendable and retractable self-leveling load-bearing feet in response to the information regarding the detected parameter of the walking surface.

In some embodiments, controller 270 is connected to a user interface, e.g., one or more input components and/or output components for use by a user to interface with the walking aid. For example, an input component, e.g., a microphone, button, or switch, can be used as part of a user-activated control mechanism to control extension and retraction of the two or more extendable and retractable self-leveling load-bearing feet. Non-limiting examples of input components include buttons, switches, keypads, touchscreens, microphones, dials, or the like. For example, an output component, e.g., a flashing light emitting diode (LED), can be used as part of a warning system configured to alert a user. Non-limiting examples of output components include audio speakers, light emitting diodes or other light generating devices, or a haptic device. In an aspect, the user interface is associated with an external portion of hand grip 240 and/or linear rod 210.

In an aspect, controller 270 includes circuitry 750 configured to actuate at least one of the two or more extendable and retractable self-leveling load-bearing feet in response to the information regarding the detected parameter of the walking surface before the at least one of the two or more extendable and retractable self-leveling load-bearing feet contacts the walking surface. For example, the controller can receive information from the at least one sensor, e.g., a camera or proximity sensor, regarding a parameter of the walking surface, e.g., a curb edge or break in the sidewalk, and actuate at least one of the two or more extendable and retractable self-leveling load-bearing feet before the at least one of the two or more extendable and retractable self-leveling load-bearing feet contacts the walking surface. In an aspect, circuitry 750 is configured to execute one or more instructions for actuating at least one of the two or more extendable and retractable self-leveling load-bearing feet in response to information regarding the detected parameter of the walking surface before the at least one of the two or more extendable and retractable self-leveling load-bearing feet contacts the walking surface.

In an aspect, controller 270 includes circuitry 755 configured to actuate extension or retraction of at least one of the two or more extendable and retractable self-leveling load-bearing feet in response to the information regarding the detected parameter of the walking surface before the at least one of the two or more extendable and retractable self-leveling load-bearing feet contacts the walking surface. For example, the controller can receive information from the at least one sensor, e.g., a camera or proximity sensor, regarding a parameter of the walking surface, e.g., a curb edge or break in the sidewalk, and actuate extension or retraction of at least one of the two or more extendable and retractable self-leveling load-bearing feet before the at least one of the two or more extendable and retractable self-leveling load-bearing feet contacts the walking surface. In an aspect, circuitry 755 is configured to execute one or more instructions for actuating extension or retraction of at least one of the two or more extendable and retractable self-leveling load-bearing feet in response to the information regarding the detected parameter of the walking surface before the at least one of the two or more extendable and retractable self-leveling load-bearing feet contacts the walking surface.

In an aspect, controller 270 includes circuitry 760 configured to independently and automatically actuate the two or more extendable and retractable self-leveling load-bearing feet. For example, the controller can receive information from the at least one sensor, e.g., a proximity sensor, regarding a parameter of the walking surface, e.g., a stepped walking surface, and independently and automatically actuate the two or more extendable and retractable self-leveling load-bearing feet to create a stable support for the user. For example, the controller includes circuitry to independently and automatically actuate each of the two of more extendable and retractable self-leveling load-bearing feet. For example, the controller includes circuitry configured to actuate one of the two or more extendable and retractable self-leveling load-bearing feet independently of each of the other two or more extendable and retractable self-leveling load-bearing feet. In an aspect, circuitry 760 is configured to execute one or more instructions for independently and automatically actuating the two or more extendable and retractable self-leveling load-bearing feet.

In an aspect, controller 270 includes circuitry 765 configured to independently and automatically actuate the two or more extendable and retractable self-leveling load-bearing feet to a configuration based on a position of the walking aid relative to the walking surface. For example, the controller can receive information from the at least one sensor, e.g., a proximity sensor, regarding the position of the walking aid relative to the walking surface, e.g., height and distance away from a step associated with a stepped walking surface, and independently and automatically actuate the two or more extendable and retractable self-leveling load-bearing feet to create a stable support for the user. In an aspect, circuitry 765 is configured to execute one or more instructions for independently and automatically actuating the two or more extendable and retractable self-leveling load-bearing feet to a configuration based on a position of the walking aid relative to the walking surface.

In an aspect, controller 270 includes circuitry 770 configured to independently and automatically actuate the two or more extendable and retractable self-leveling load-bearing feet to a configuration based on a position of variance of the walking aid from vertical. For example, the controller can receive information from at least one accelerometer regarding a tilt or inclination of the walking aid relative to the walking surface and independently and automatically actuate the two or more extendable and retractable self-leveling load-bearing feet to create stable support for the user. In an aspect, circuitry 770 is configured to execute one or more instructions for independently and automatically actuating the two or more extendable and retractable self-leveling load-bearing feet to a configuration based on a position of variance of the walking aid from vertical.

Returning to FIG. 7, in some embodiments, walking aid 200 includes user-activated control mechanism 775. In an aspect, a walking aid includes a user-activated control mechanism to control extension and retraction of the two or more extendable and retractable self-leveling load-bearing feet. In an aspect, the user-activated control mechanism 775 is a voice-activated control mechanism 780. For example, the walking aid can include a microphone and circuitry configured to receive, process, and transmit a voice command to the controller. For example, the voice commands can include "on," "off" "extend," "retract," and the like. In an aspect, the user-activated control mechanism 775 is a manually activated control mechanism 785. For example, the walking aid can include one or more buttons or other pressure sensitive pads and circuitry configured to receive and process a manual activation command, e.g., pushing of a button. In an aspect, at least a portion of the user-activated control mechanism is incorporated into the hand grip disposed in proximity to the first end of the linear rod. For example, the hand grip can include a microphone for receiving a voice command. For example, the hand grip can include one or more pressure-sensitive buttons or pads for sending a manual activation command.

Figure 8:
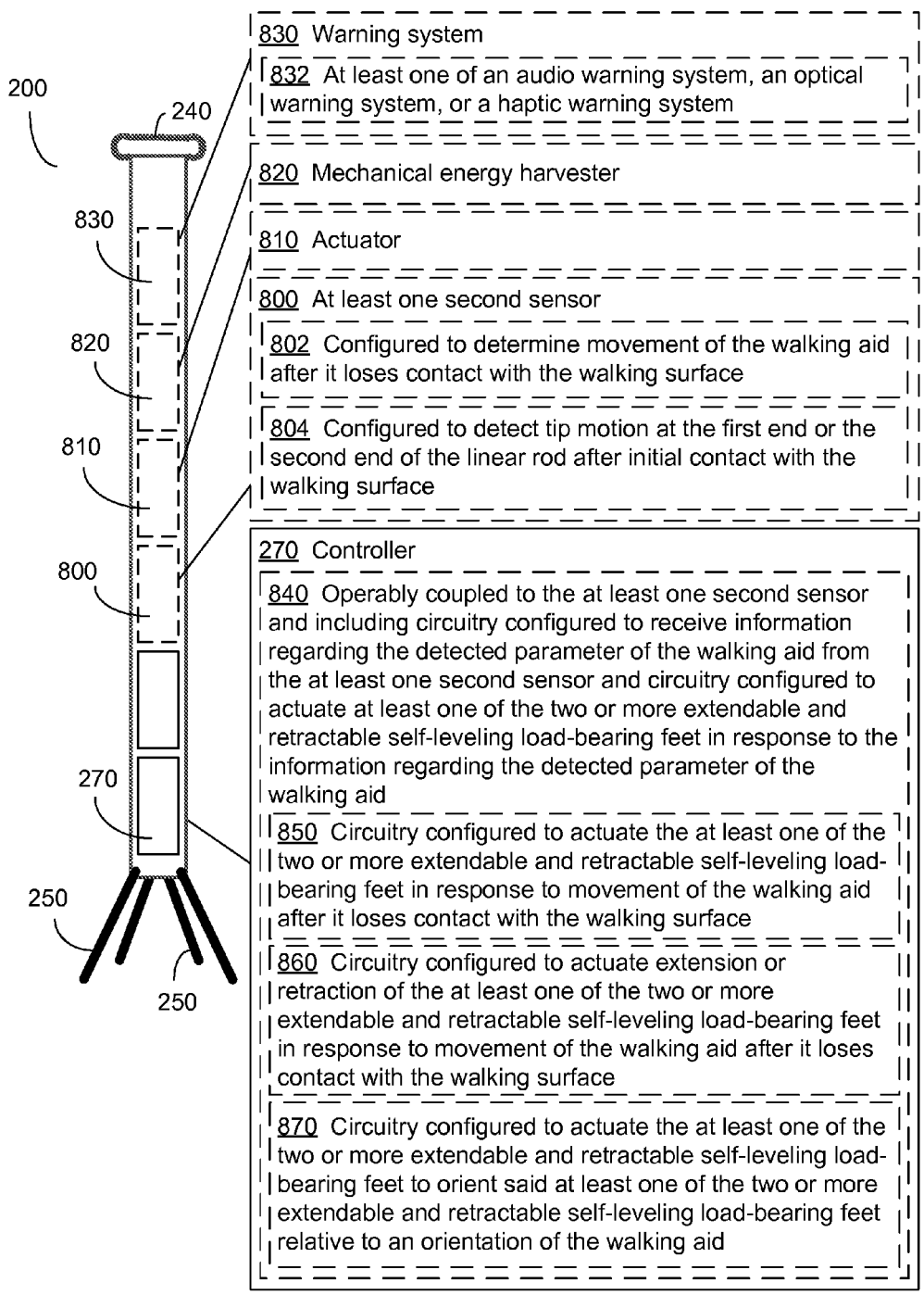
FIG. 8 shows further aspects of a walking aid such as depicted in FIG. 2A.

FIG. 8 illustrates further aspects of a walking aid. In some embodiments, walking aid 200 includes at least one second sensor 800 configured to detect a parameter of the walking aid 200. In an aspect, the parameter of the walking aid comprises at least one of tip motion, movement, position relative to the walking surface, tilt angle relative to the walking surface, or distance from the walking surface. In an aspect, the at least one second sensor includes at least one of a tactile sensor, a tilt sensor, an inclinometer, an accelerometer, a gyroscope, a camera, a whisker sensor, a proximity sensor, and/or a pressure sensor.

In an aspect, at least one second sensor 800 is configured to determine movement of the walking aid after it loses contact with the walking surface, as shown in block 802. For example, an accelerometer in combination with a pressure sensor can be used to detect when the walking aid loses contact with the walking surface and what the movement of the walking aid looks like after losing contact. In an aspect, a tilt sensor or inclinometer in combination with accelerometers can measure the pitch and roll of the walking aid relative to the walking surface after the walking aid loses contact with the walking surface. In an aspect, a combination of two or more sensors is used to measure the height of the walking aid. For example, a combination of 3D gyroscopes, 3D accelerometers, 3D magnetometers, and a barometric altimeter can be used as a height sensor. See, e.g., Tanigawa et al. (2008) "Drift-free dynamic height sensor using MEMS IMU aided by MEMS pressure sensor" Proceedings of the 5$^{th}$ Workshop on Positioning, Navigation, and Communication 2008, pp. 191-196, which is incorporated herein by reference.

In an aspect, at least one second sensor 800 is configured to detect tip motion at the first end or the second end of the linear rod after initial contact with the walking surface, as shown in block 804. For example, a 2-axis inclinometer with accelerometers can be used to measure a tipping motion, tilt, or variance from vertical of the walking aid relative to a walking surface. Non-limiting examples of inclinometers and accelerometers have been described above herein.

In an aspect, controller 270 is operably coupled to the at least one second sensor 800, the controller including circuitry configured to receive information regarding the detected parameter of the walking aid 200 from the at least one second sensor 800 and circuitry configured to actuate at least one of the two or more extendable and retractable self-leveling load-bearing feet 250 in response to the information regarding the detected parameter of the walking aid 200, as shown in block 840. For example, the controller can include circuitry to actuate at least one of the two or more extendable and retractable self-leveling load-bearing feet in response to detecting a substantial tilt in the walking aid relative to the walking surface. In an aspect, the circuitry is configured to execute one or more instructions for receiving information regarding the detected parameter of the walking aid 200 from the at least one second sensor 800 and one or more instructions for actuating at least one of the two or more extendable and retractable self-leveling load-bearing feet 250 in response to the information regarding the detected parameter of the walking aid 200.

In an aspect, controller 270 includes circuitry 850 configured to actuate the at least one of the two or more extendable and retractable self-leveling load-bearing feet in response to movement of the walking aid 200 after it loses contact with the walking surface. For example, the circuitry can be configured to actuate at least one of the two or more extendable and retractable self-leveling load-bearing feet based on information from one or more accelerometers regarding movement of the walking aid after it loses contact with the walking surface. In an aspect, circuitry 850 is configured to execute one or more instructions for actuating the at least one of the two or more extendable and retractable self-leveling load-bearing feet in response to movement of the walking aid 200 after it loses contact with the walking surface.

In an aspect, controller 270 includes circuitry 860 configured to actuate extension or retraction of the at least one of the two or more extendable and retractable self-leveling load-bearing feet 250 in response to movement of the walking aid 200 after it loses contact with the walking surface. For example, the circuitry can be configured to extend or retract at least one of the two or more extendable and retractable self-leveling load-bearing feet based on information from one or more accelerometers regarding movement of the walking aid after it loses contact with the walking surface. In an aspect, circuitry 860 is configured to execute one or more instructions for actuating extension or retraction of the at least one of the two or more extendable and retractable self-leveling load-bearing feet 250 in response to movement of the walking aid 200 after it loses contact with the walking surface.

In an aspect, controller 270 includes circuitry 870 configured to actuate the at least one of the two or more extendable and retractable self-leveling load-bearing feet 250 to orient said at least one of the two or more extendable and retractable self-leveling load-bearing feet 250 relative to an orientation of the walking aid 200. For example, the circuitry can be configured to orient the two or more extendable and retractable self-leveling load-bearing feet at an angle relative to the orientation of the walk aid. For example, the circuitry can be configured to orient the two or more extendable and retractable self-leveling load-bearing feet relative to the walking surface when the walking aid is oriented at an angle (e.g., tilted) relative to the walking surface to create a stable support for the user. In an aspect, circuitry 870 is configured to execute one or more instructions for actuating the at least one of the two or more extendable and retractable self-leveling load-bearing feet 250 to orient said at least one of the two or more extendable and retractable self-leveling load-bearing feet 250 relative to an orientation of the walking aid 200.

In some embodiments, walking aid 200 includes an actuator 810 operably coupled to the controller 270 and configured to actuate the two or more extendable and retractable self-leveling load-bearing feet 250. In an aspect, actuator 810 produces a rotational motion. For example, actuator 810 can be used to rotate at least a portion of an extendable and retractable self-leveling load-bearing foot around a pivot point. In an aspect, actuator 810 produces a linear motion. For example, actuator 810 can be used to extend and retract two or more telescoping segments of an extendable and retractable self-leveling load-bearing foot. In an aspect, actuator 810 includes at least one of a spring, a motor, a pneumatic actuator, or a hydraulic actuator. In an aspect, actuator 810 includes at least one of a linear actuator, a solenoid, or a muscle wire. In an aspect, the actuator 810 comprises a combination of a spring, a motor, a pneumatic actuator, a hydraulic actuator, a linear actuator, a solenoid, and/or a muscle wire. For example, a pneumatic actuator can be combined with a spring to extend and retract one or more of the extendable and retractable self-leveling load-bearing feet.

In an aspect, actuator 810 includes at least one spring operably coupled to controller 270 and configured to actuate at least one of the two or more extendable and retractable self-leveling load-bearing feet 250.

In an aspect, actuator 810 includes at least one motor operably coupled to controller 270 and configured to actuate at least one of the two or more extendable and retractable self-leveling load-bear feet 250. In an aspect, the at least one motor includes circuitry to extend and retract the extendable and retractable self-leveling load-bearing feet. In an aspect, the motor includes at least one of a DC motor, a geared DC motor, a servo motor, a stepper motor, or a geared stepper motor. In an aspect, the at least one motor is an electric motor. In an aspect, the motor is a rotary shaft motor, such as a conventional DC, pulse, or AC motor. In an aspect, the motor can include a brush DC motor. In an aspect, the motor can include a DC servo. In an aspect, the motor can include a rotary piezoelectric motor. Other non-limiting examples of motors for use in actuating the extendable and retractable self-leveling load-bearing feet include a stepper control motor, a brushless DC commutated control motor, or a universal motor. For example, a stepper motor or servo can be used to extend or retract the extendable and retractable self-leveling load-bearing feet that include two or more telescoping segments. For example, a motorized threaded rod can be used to extend or retract the extendable and retractable self-leveling load-bearing feet. In general, motors for use in small electronics or hand-held devices are known in the art and available from commercial sources.

In an aspect, actuator 810 includes a pneumatic actuator operably coupled to controller 270 and configured to actuate at least one of the two or more extendable and retractable self-leveling load-bearing feet 250. See, e.g., Granosik & Borenstein (2005) "Pneumatic actuators for serpentine robot" $8^{th}$ International Conference on Walking and Climbing Robots (CLAWAR), London, U.K., 12-15 Sep. 2005, pp. 719-726, which are incorporated herein by reference. Pneumatic actuators are available from commercial sources (from, e.g., Bimba Manufacturing, University Park, Ill.; ASCO Numatics, Florham Park, N.J.).

In an aspect, actuator 810 includes a hydraulic actuator operably coupled to controller 270 and configured to actuate at least one of the two or more extendable and retractable self-leveling load-bearing feet 250

In an aspect, actuator 810 includes a thermal- or magnetic-responsive actuator operably coupled to controller 270 and configured to actuate at least one of the two or more extendable and retractable self-leveling load-bearing feet 250. For example, the actuator can include a shape memory material, e.g., shape memory alloys responsive to heat and/or magnetic shape-memory alloys responsive to a magnetic field. For example, the actuator can include a spring formed from a shape memory material. See, e.g., U.S. Pat. No. 7,104,056 to Taya et al. titled "Design of ferromagnetic shape memory allow composites and actuators incorporating such materials;" and U.S. Pat. No. 8,586,176 to Taya & Liang titled "Shape memory alloy fibers and shape memory polymer fibers and films and their composites for reversible shape changes," which are incorporated herein by reference.

In an aspect, actuator 810 includes a mechanical actuator operably coupled to controller 270 and configured to actuate at least one of the two or more extendable and retractable self-leveling load-bearing feet 250. In an aspect, the mechanical actuator is configured to convert rotary motion into linear motion. For example, the mechanical actuator can use one or more of gears, rails, pulleys, chains, or other devices to operate. For example, extension and retraction of the two or more extendable and retractable self-leveling load-bearing feet can be actuated using a series of gears and pulleys operably linked to one or more motors.

In an aspect, the walking aid includes a power source for powering any or all components of the walking aid. In an aspect, the walking aid includes one or more disposable batteries, e.g., cells, buttons, thin-film batteries, or microbatteries. For example, the components of the walking aid can be powered by a conventional battery, e.g., a disposable 9 volt battery. Non-limiting examples of disposable batteries include zinc-carbon, alkaline, lithium, zinc-chloride, zinc-air, or silver-oxide batteries. In an aspect, the one or more batteries include one or more rechargeable batteries. For example, the components of the walking aid can be powered by one or more rechargeable lithium-ion batteries. Non-limiting examples of rechargeable batteries include nickel-cadmium, nickel-zinc, nickel metal hydride, silver-zinc, or lithium ion.

In some embodiments, walking aid 200 further includes a mechanical energy harvester 820 configured to store electrical or mechanical energy to power actuation of the two or more extendable and retractable self-leveling load-bearing feet 250. In an aspect, the mechanical energy harvester stores mechanical energy generated when the walking aid periodically contacts the walking surface. For example, the intermittent mechanical energy generated when the walking aid contacts the walking surface can be converted into electrical energy through at least one of piezoelectric conversion, electro-active polymers (EAP) conversion, or electromagnetic conversion. For example, the mechanical energy harvester can include one or more piezoelectric materials, dielectric elastomers, and/or rotator generators. See, e.g., Yusuf et al. (2013) "Mechanical energy harvesting devices for low frequency applications: Revisited," *ARPN J Eng. App. Sci.* 8:504-512, which is incorporated herein by reference. In an aspect, the mechanical energy harvester stores electrical or mechanical energy for powering one or more components of the walking aid. In an aspect, the mechanical energy harvester stores electrical or mechanical energy for powering an actuator, e.g., spring, a motor, a pneumatic actuator, a hydraulic actuator, or solenoid, to power actuation of the two or more extendable and retractable self-leveling load-bearing feet 250. In an aspect, power from a mechanical energy harvester is combined with another power source, e.g., a standard battery, to power the components of the walking aid.

In some embodiments, walking aid 200 includes warning system 830 operably coupled to controller 270 and configured to alert a user. For example, the walking aid can include a warning system that alerts a user to a dangerous walking surface or situation. For example, the walking aid can include a warning system that alerts a user to the dangers of a slippery surface, e.g., an oily, icy, or water-covered surface). For example, the walking aid can include a warning system that alerts a user to dangers associated with a specific friction coefficient, e.g., too little or too much, that might create a dangerous walking situation. For example, the walking aid can include a warning system that alerts a user to the dangers of a slope in the walking surface, e.g., an incline or a decline of a percent grade that might be of difficulty for the user. For example, the walking aid can include a warning system that alerts a user to the proximity of an edge, e.g., an edge associated with a curb or a step. For example, the walking aide can include a warning system that alerts a user to poor load-bearing capability of a surface, e.g., the poor load-bearing capability of deep sand or thick grass.

In an aspect, warning system 830 is at least one of an audible warning system, an optical warning system, or a haptic warning system 832. In an aspect, the warning system includes a speaker, a soundcard, and circuitry configured to broadcast an audible alert in response to receiving a warning signal from the controller. For example, the warning system can include an audible alert, e.g., a beeping sound or a warning voice. In an aspect, the warning system includes one or more light sources, and circuitry configured to emit an optical alert in response to receiving a warning signal from the controller. For example, the warning system can include an optical alert, e.g., one or more flashing red LEDs. In an aspect, the warning system includes a vibrator and circuitry configured to vibrate at least a portion of the walking aid in response to receiving a warning signal from the controller. For example, the hand grip of the walking aid can include a haptic device, e.g., a vibrator, which vibrates the hand grip in response to a warning signal from the controller.

In an aspect, warning system 830 is incorporated into the hand grip of the walking aid. In an aspect, at least one of an audible warning system, an optical warning system, or a haptic warning system 832 is incorporated into hand grip 240. For example, the warning system can include one or more lights, e.g., LEDs, incorporated into the hand grip that flash on/off to alert the user. For example, the warning system can include a speaker incorporated into the hand grip that emits an audible sound, e.g., a beeping sound, to alert the user. For example, the warning system can include a haptic vibration device that vibrates the hand grip of the walking device to alert the user. Alternatively, the warning system can be incorporated into one or more other parts of the walking aid, e.g., into the linear rod or into at least one of the two or more extendable and retractable self-leveling load bearing feet.

In some embodiments, a walking aid such as described herein may be operably connected to a remote signaling device to provide information regarding the environment in which the walking aid is in or is entering. In some embodiments, a system includes a walking aid including a linear rod having a first end and a second end; a hand grip disposed in proximity to the first end of the linear rod; two or more extendable and retractable self-leveling load-bearing feet at the second end of the linear rod; at least one receiver; and a controller attached to the linear rod and operably connected to the at least one receiver and to the two or more extendable and retractable self-leveling load-bearing feet; and a remote signaling device in wireless communication with the at least one receiver, the remote signaling device configured to transmit a signal, wherein the at least one receiver is configured to receive the signal from the remote signaling device and configured to transform the signal into information regarding a location of the walking aid in an environment, and wherein the controller includes circuitry configured to actuate at least one of the two or more extendable and retractable self-leveling load-bearing feet based on the information regarding the location of the walking aid in the environment.

Figure 9:
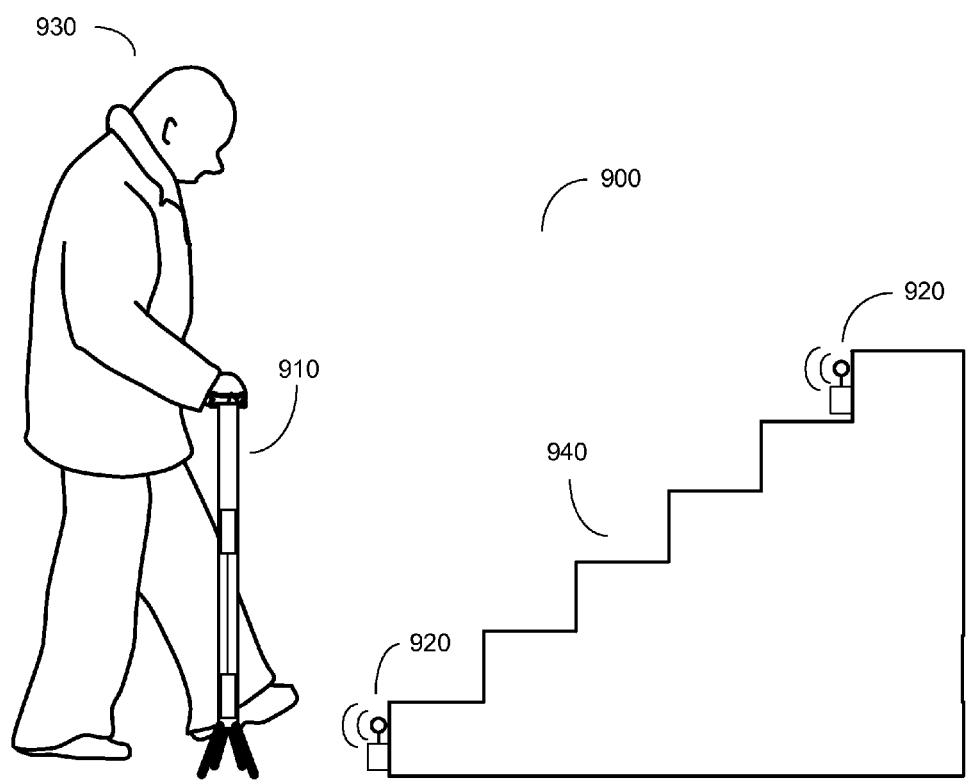
FIG. 9 is a schematic of a system including a walking aid and a remote signaling device and a user near a stepped walking surface.

With reference to FIG. 9, shown is an example of a system including a walking aid and a remote signaling device which can serve as a context for one or more devices, systems, and/or methods described herein. FIG. 9 shows a system 900 including a walking aid 910 and a remote signaling device 920. Walking aid 910 includes a linear rod, a hand grip, and two or more extendable and retractable self-leveling load-bearing feet. Walking aid 910 further includes at least one receiver and a controller attached to the linear rod and operably coupled to the at least one receiver and to the two or more extendable and retractable self-leveling load-bearing feet. Remote signaling device 920 is in wireless communication with the at least one receiver of walking aid 910 and is configured to transmit a signal. The receiver of walking aid 910 is configured to receive the signal from the remote signaling device 920 as a user 930 approaches an environment and configured to transform the signal into information regarding a location of the walking aid 910 in the environment, e.g., approaching a stepped walking surface 940. For example, the remote signaling system may be situated such that it sends one or more signals from the top and/or bottom of a staircase to inform the walking aid that the user is approaching or is in the process of engaging a staircase. The controller includes circuitry configured to actuate at least one of the two or more extendable and retractable self-leveling load-bearing feet based on the information regarding the location of the walking aid 910 in the environment FIG. 10 illustrates further aspects of system 900 including walking aid 910 and remote signaling device 920. System 900 includes walking aid 910 including linear rod 1000 including a first end 1005 and a second end 1010, a hand grip 1015 disposed in proximity to the first end 1005 of linear rod 1000, two or more extendable and retractable self-leveling load-bearing feet 1020 at the second end 1010 of the linear rod 1000, at least one receiver 1025, and a controller 1030 attached to the linear rod 1000 and operably connected to the at least one receiver 1025 and to the two or more extendable and retractable self-leveling load-bearing feet 1020. System 900 further includes a remote signaling device 920 in wireless communication with the at least one receiver 1025, the remote signaling device 920 configured to transmit a signal 1035; wherein the at least one receiver 1025 is configured to receive the signal 1035 from the remote signaling device 920 and configured to transform the signal 1035 into information regarding a location of the walking aid 910 in an environment, and wherein the controller 1030 includes circuitry 1031 configured to actuate at least one of the two or more extendable and retractable self-leveling load-bearing feet 1020 based on the information regarding the location of the walking aid 910 in the environment.

System 900 includes walking aid 910 including a linear rod 1000 and hand grip 1015. Non-limiting aspects of a linear rod and a hand grip for use with a walking aid have been described above herein.

Walking aid 910 further includes two or more extendable and retractable self-leveling load-bearing feet 1020. In an aspect at least one of the two or more extendable and retractable self-leveling load-bearing feet 1020 has two or more telescoping segments. In an aspect, at least one of the two or more extendable and retractable self-leveling load-bearing feet 1020 has a pivot at a connection to linear rod 1000 and two or more telescoping segments. In an aspect, at least one of the two or more extendable and retractable self-leveling load-bearing feet 1020 has a pivot at a connection to the linear rod 1000 and one or more additional pivots along a length of the at least one of the two or more extendable and retractable self-leveling load-bearing feet 1020. In an aspect, at least one of the two or more extendable and retractable self-leveling load-bearing feet 1020 is rotatable. In an aspect, the two or more extendable and retractable self-leveling load-bearing feet 1020 are operable to make the linear rod free-standing. In an aspect, at least one of the two or more extendable and retractable self-leveling load-bearing feet 1020 is configured to retract for storage on a side of the linear rod. In an aspect, at least one of the two or more extendable and retractable self-leveling load-bearing feet 1020 is configured to retract for storage into an interior portion of the linear rod. Non-limiting aspects of extendable and retractable self-leveling load-bearing feet for use with a walking aid have been described above herein.

Walking aid 910 of system 900 includes at least one receiver 1025 configured to receive the signal from the remote signaling device 920 and configured to transform the signal into information regarding a location of the walking aid 910 in an environment. In an aspect, the at least one receiver 1025 is configured to receive at least one of a radio signal, a magnetic signal, an acoustic signal, an electromagnetic signal, or an optical signal, as shown in block 1070. In an aspect, at least one receiver 1025 includes at least one antenna configured to intercept signals emitted from the remote signaling device 920. In an aspect, at least one receiver 1025 includes at least one filter, e.g., an electronic filter, a frequency filter, or a bandwidth filter, to separate specific signals from the remote signaling device from other signals in the environment. In an aspect, the at least one receiver 1025 includes a digital signal processor.

In an aspect, the at least one receiver 1025 comprises at least one electromagnetic signal receiver 1071. In an aspect, the at least one electromagnetic signal receiver 1071 is configured to receive an electromagnetic signal from a remote electromagnetic signal generator and configured to transform the electromagnetic signal into information regarding a location of the walking aid in an environment. In an aspect, the at least one electromagnetic signal receiver 1071 is configured to receive an ultraviolet signal, a visible light signal, an infrared signal, a microwave signal, or a radio wave signal.

In an aspect, the at least one receiver 1025 comprises at least one magnetic signal receiver 1072. In an aspect, the at least one magnetic signal receiver 1072 is configured to receive a magnetic signal from a remote magnetic field signal generator and configured to transform magnetic signal into information regarding a location of the walking aid in an environment. For example, the at least one magnetic signal receiver can include a digital or analog Hall effect sensor for detecting a magnetic field emitted by the remote signaling device. In an aspect, the at least one receiver includes a magnetometer configured to measure a strength and direction of magnetic field at a point in space. In an aspect, the at least one receive includes a MEMS magnetometer. Other non-limiting examples of receivers of detecting a magnetic field include a magneto-diode, magneto-transistor, anisotropic magnetoresistance (AMR) magnetometer, giant magnetoresistance (GMR) magnetometer, magnetic tunnel junction magnetometer, magneto-optical sensor, Lorentz-force-based MEMS sensor, fluxgate magnetometer, or search coil magnetic field sensor.

In an aspect, the at least one receiver 1025 comprises at least one radiofrequency signal receiver 1073. In an aspect, the at least one radiofrequency signal receiver 1073 is configured to receive a radiofrequency signal from a remote radiofrequency signal generator and configured to transform the radiofrequency signal into information regarding a location of the walking aid in an environment. In an aspect, the at least one radiofrequency signal receiver is tuned to receive a specific frequency. In an aspect, the at least one radiofrequency signal receiver includes a radiofrequency module, e.g., a superheterodyne receiver or a super-regenerative receiver. In an aspect, the at least one radiofrequency module is part of an electronic circuit and can include a WLAN module, a Zigbee module, a Bluetooth module, a GPS module, an RFID module, or a UHF module (from, e.g., Future Electronics, Pointe Claire, Quebec, Canada).

In an aspect, the at least one receiver 1025 comprises at least one photodetector 1074. In an aspect, the at least one photodetector 1074 is configured to receive an optical signal from a remote optical signal generator and configured to transform the optical signal into information regarding a location of the walking aid in an environment. For example, the walking aid can include one or more photodetectors configured to detect a specific wavelength of light or other electromagnetic energy emitted by the remote signaling device. In an aspect, the at least one photodetector is incorporated into a camera. Non-limiting examples of photodetectors include photodiodes, metal-semiconductor-metal (MSM) photodetectors, phototransistors, photoresistors, photomultipliers, pyroelectric photodetectors, and thermal detectors. In an aspect, the at least one receiver comprises an array of photodetectors. Photodetectors are available from commercial sources (from, e.g., AC Photonics, Santa Clara, Calif.; Electro-Optics Technology, Inc., Traverse City, Mich.; and OSI Laser Diode, Inc., Edison, N.J.).

In an aspect, the at least one receiver 1025 comprises at least one infrared sensor 1075. In an aspect, the at least one infrared sensor 1075 is configured to receive an infrared signal from a remote infrared signal generator and configured to transform the infrared signal into information regarding a location of the walking aid in an environment. For example, the walking aid can include components of an infrared sensitive charge-coupled device (CCD) camera. For example, the walking aid can include at least one passive infrared sensor configured to detect infrared light emitted by the remote signaling device. A non-limiting example of a passive infrared sensor includes a solid state sensor made from one or more pyroelectric materials, e.g., lithium tantalite and/or strontium barium niobate. Infrared detectors are available from commercial sources (from, e.g., SparkFun Electronics, Niwot, Colo.).

In an aspect, the at least one receiver 1025 comprises at least one microphone 1076. In an aspect, the at least one microphone 1076 is configured to receive an audio/acoustic signal from a remote audio/acoustic signal generator and configured to transform the audio/acoustic signal into information regarding a location of the walking aid in an environment. For example, the walking aid can include at least one microphone configured to detect audible sound, e.g., audible beeping, emitted from the remote signaling device. In some embodiments, the at least one microphone is configured to detect infrasound or low-frequency sound that is at a frequency below the "normal" limit of human hearing or below about 20 hertz or cycles per second. In some embodiments, the at least one microphone includes a transducer configured to detect ultrasound. In an aspect, the at least one microphone includes a sound transducer, e.g., a dynamic moving coil, electret condenser, ribbon, or piezoelectric crystal sound transducer.

Walking aid 910 of system 900 includes controller 1030 attached to the linear rod 1000 and operably connected to the at least one receiver 1025 and to the two or more extendable and retractable self-leveling load-bearing feet 1020. Controller 1030 includes a microprocessor and circuitry. In an aspect, the microprocessor includes a central processing unit for controlling one or more functions of the walking aid. The controller further includes a system memory and a system bus that couples various system components including the system memory to the microprocessor. The microprocessor can include a processing unit, a central processing unit (CPU), a digital signal processor (DSP), an application-specific integrated circuit (ASIC), a field programmable gate entry (FPGA), or the like, or any combinations thereof, and can include discrete digital or analog circuit elements or electronics, or combinations thereof. In an aspect, the controller includes one or more ASICs having a plurality of pre-defined logic components. In an aspect, the controller includes one or more FPGA having a plurality of programmable logic commands.

Controller 1030 further includes circuitry configured to execute one or more instructions for operating components of the walking aid, e.g., the at least one receiver and the two or more extendable and retractable self-leveling load-bearing feet. In an aspect, the circuitry includes at least one of software and/or a processor programed to execute one or more instructions for operating the walking aid. In an aspect, the circuitry includes circuitry configured to execute one or more instructions for operating any or all other components incorporated into the walking aid, e.g., a user-activated control mechanism, a user interface, at least one sensor, at least one second sensor, an actuator, a power source, a mechanical energy harvester, and/or a warning system. In an aspect, the controller includes circuitry configured to execute one or more instructions for actuating at least one of the two or more extendable and retractable self-leveling load-bearing feet based on the information regarding the location of the walking aid in the environment.

In some embodiments, controller 1030 is connected to a user interface, e.g., one or more input components and/or output components for use by a user to interface with the walking aid. For example, an input component, e.g., a microphone, button, or switch, can be used as part of a user-activated control mechanism to control extension and retraction of the two or more extendable and retractable self-leveling load-bearing feet. Non-limiting examples of input components include buttons, switches, keypads, touchscreens, microphones, dials, or the like. For example, an output component, e.g., a flashing light, can be used as part a warning system configured to alert a user. Non-limiting examples of output components include audio speakers, light emitting diodes or other light generating devices, or a haptic device. In an aspect, the user interface is associated with an external portion of hand grip 1015 and/or linear rod 1000.

System 900 further includes remote signaling device 920 in wireless communication with the at least one receiver 1025 of walking aid 910. The remote signaling device 920 is configured to transmit a signal 1035. For example, the remote signaling device can include a transmitter which transmits a continuous or periodic signal. In an aspect, system 900 includes one remote signaling device 920. For example, a single remote signaling device can be placed in association with a walking hazard, e.g., an uneven patch of walking surface, to communicate with a walking aid when it comes into range or proximity to the remote signaling device and the associated walking hazard. In an aspect, system 900 includes two or more remote signaling devices 920. For example, two or more remote signaling devices can be placed along a walking surface, e.g., a staircase or stairwell, to communicate with a walking aid when it comes into range or proximity of the two or more remote signaling devices.

In an aspect, the remote signaling device 920 includes one or more beacons 921. For example, the one or more beacons can include one or more radio beacons configured to emit a radio frequency, e.g., high frequency (HF), very high frequency (VHF), ultra-high frequency (UHF), or microwave frequencies. In an aspect, at least one of the one or more beacons 921 emits a radio signal, a magnetic field, an acoustic signal, an electromagnetic signal, or an optical signal, as shown in block 922. In an aspect, at least one of the one or more beacons 921 includes a camera. In an aspect, at least one of the one or more beacons 921 includes Wi-Fi, inaudible sound waves, or LED lighting.

In an aspect, remote signaling device 920 includes an electromagnetic signal generator 923. In an aspect, the electromagnetic signal generator 923 emits at least one of an ultraviolet signal, a visible light signal, an infrared signal, a microwave signal, or a radio wave signal. For example, the electromagnetic signal generator can include one or more radio or microwave beacons. In an aspect, the electromagnetic signal generator 923 emits signals of a single or narrow bandwidth for selective detection by the at least one receiver on the walking aid. For example, the electromagnetic signal generator can include one or more infrared beacons configured to continuously or periodically transmit a modulated light beam in the infrared spectrum, e.g., 980 nanometers, and the walking aid can include a receiver with one or more filters to detect the specific wavelength of infrared energy. In an aspect, the electromagnetic signal generator 923 includes an optical output. For example, the electromagnetic signal generator can include a laser or light emitting diode (LED) for emitting one or more beams of visible light. For example, the electromagnetic signal generator can include an infrared LED for emitting an infrared signal.

In an aspect, the remote signaling device 920 includes a radiofrequency signal generator 924. For example, the system can include one or more radio beacons configured to transmit radio signals detectable by a radiofrequency signal receiver associated with a walking aid. For example, the system can include one or more beacons configured to emit a radiofrequency, e.g., high frequency (HF), very high frequency (VHF), or ultra-high frequency (UHF). In an aspect, the radiofrequency signal generator 924 generates a single or narrow radio frequency for detection by the at least one receiver on the walking aid. Non-limiting examples of systems making use of the radio spectrum include FM radios, radars, cellular networks, DECT phones, WLAN, ZigBee, RFID, ultra-wideband, high sensitive GNSS and pseudolite systems.

In an aspect, the remote signaling device 920 includes a microwave signal generator 925. For example, the system can include one or more microwave beacons configured to transmit microwave signals detectable by a microwave signal receiver associated with the walking aid. For example, the system can include one or more beacons configured to emit microwave frequencies (3-30 GHz). In an aspect, the microwave signal generator 925 generates a single or narrow microwave frequency for detection by the at least one receiver on the walking aid.

In an aspect, remote signaling device 920 includes a magnetic signal generator 926. For example, the remote signaling device can include magnetic beacon including a current carrying coil, a capacitor, and a signal generator while the receiver associated with the walking aid includes a tri-axial search-coil magnetometer. See, e.g., Sheinker et al. (2013) "Localization in 3-D Using Beacons of Low Frequency Magnetic Field" IEEE Transactions on Instrumentation and Measurement, 62:3194-3201, which is incorporated herein by reference.

In an aspect, the remote signaling device 920 includes an acoustic signal generator 927. In an aspect, the acoustic signal generator 927 emits sound, ultrasound, or infrasound. In an aspect, the acoustic signal generator 927 emits an audible signal. In an aspect, the acoustic signal generator 927 emits an acoustic signal just outside the range of human hearing. For example, the acoustic signal generator can emit infrasound or low-frequency sound that is at a frequency below the "normal" limit of human hearing or below about 20 hertz or cycles per second. In an aspect, the acoustic signal generator includes an audio sound transducer for generating acoustic waves.

In an aspect, the remote signaling device 920 includes an RFID signal/receiver 928. For example, the remote signaling device can include a radiofrequency identification (RFID) tag readable by the at least one receiver on the walking aid. In an aspect, the RFID tag is powered and the at least one receiver includes an antenna of sufficient size and sensitivity to detect the signal from the tag. In an aspect, the remote signaling device 920 includes an RFID tag capable of being read from a distance, e.g., 1-10 meters. For example, the walking aid can include an RFID reader capable of reading RFID tags at 5 meters. In an aspect, the read distance is dependent upon the RFID reader and antenna associated with the walking aid and the properties of the RFID tag. RFID tags and readers are available from commercial sources (from, e.g., SkyRFID, Inc., Toronto, Ontario, Canada). In an aspect, the RFID signal/receiver 928 includes a passive RFID system. See, e.g., Sabesan et al. (2014) "Wide area passive UHF RFID system using antenna diversity combined with phase and frequency hopping" IEEE Transactions on Antennas and Propagation, 62:878-888, which is incorporated herein by reference.

In an aspect, the remote signaling device 920 includes a local positioning system 929. In an aspect local positioning system 929 includes three or more signaling beacons with known locations. For example, the location positioning system can include three or more signaling beacons distributed throughout a user's residence and particularly associated with hazardous or potentially hazardous walking surfaces, e.g., stairs or surface transitions. The one or more signaling beacons can emit one or more of radio signals, electromagnetic signals, magnetic signals, acoustic signals, or optical signals. In an aspect, local positioning system 929 includes a real-time locating system. In an aspect, local positioning system 929 includes an indoor positioning system. In an aspect, local positioning system 929 includes a hybrid positioning system. Non-limiting examples of technologies for use in a local position system include cameras, infrared, acoustic, WLAN/WiFi, RFID, ultra-wideband, high sensitive GNSS, pseudolites, inertial navigation, and magnetic systems.

In some embodiments, controller 1030 includes circuitry 1032 configured to correlate the information regarding the location of the walking aid in the environment with a map of the environment. In an aspect, the map includes a map derived from a global positioning system (GPS). In an aspect, the map includes a map derived from a local positioning system. In an aspect, the map includes a floor plan of a house or other building. For example, the map can include a map of the user's home. For example, the map can include a map of a location frequented by the user, e.g., a school, a health clinic or hospital, an airport, a shopping mall, or other place of business. In an aspect, the map includes information regarding the walking surfaces associated with the map. For example, the map can include information regarding the surface of the walking surface, e.g., smooth, rough, stepped, or uneven, or transition points in the walking surface, e.g., transition from one material to another, changes in slope, or steps.

In some embodiments, the walking aid 910 of system 900 includes at least one sensor 1040 operably coupled to the controller 1030 and configured to detect a parameter of a walking surface 1045 in proximity to the walking aid 910, wherein the controller 1030 includes circuitry configured to receive information regarding the detected parameter of the walking surface 1045 from the at least one sensor 1040 and circuitry configured to actuate at least one of the two or more extendable and retractable self-leveling load-bearing feet 1020 in response to the information regarding the detected parameter of the walking surface 1045. The parameter of the walking surface includes at least one of a surface type, a friction coefficient, a roughness, a slope, an edge, a height, a distance, or a bump.

In an aspect, at least one sensor 1040 is incorporated into an interior portion of linear rod 1000. For example, an accelerometer, tilt sensor, or inclinometer can be incorporated into an interior portion of the linear rod. In an aspect, at least one sensor 1040 is incorporated onto an outer surface of linear rod 1000. For example, a camera or proximity sensor can be attached to an outer surface of the linear rod. In an aspect, at least one sensor 1040 is incorporated into hand grip 1015. In some embodiments, at least one of the two or more extendable and retractable self-leveling load-bearing feet 1020 includes at least one sensor 1040. For example, that portion of an extendable and retractable self-leveling load-bearing foot that makes contact with the walking surface can include one or more sensors, e.g., one or more pressure sensors.

In an aspect, the at least one sensor 1040 includes a tactile sensor. In an aspect, at least one sensor 1040 includes at least one of a tilt sensor or an inclinometer. In an aspect, at least one sensor 1040 includes a texture sensor. In an aspect, at least one sensor 1040 includes at least one of an accelerometer or a gyroscope. In an aspect, the accelerometer is configured to be located on the linear rod and configured to detect height differences between successive contacts with the walking surface. In an aspect, the accelerometer is configured to be located on a user. In an aspect, at least one sensor 1040 includes a camera. In an aspect, at least one sensor 1040 includes a proximity sensor. In an aspect, the proximity sensor includes at least one of a photoelectric proximity sensor, an acoustic proximity sensor, and a capacitive proximity sensor. In an aspect, at least one sensor 1040 includes at least one pressure sensor. Non-limiting aspects of sensors for detecting a parameter of a walking surface in proximity to a walking aid have been described above herein.

In an aspect, controller 1030 includes circuitry configured to actuate extension or retraction of at least one of the two or more extendable and retractable self-leveling load-bearing feet 1020 in response to the information regarding the detected parameter of the walking surface 1045 before the at least one of the two or more extendable and retractable self-leveling load-bearing feet 1020 contacts the walking surface 1045. In an aspect, controller 1030 includes circuitry configured to independently and automatically actuate the two or more extendable and retractable self-leveling load-bearing feet 1020. In an aspect, controller 1030 includes circuitry configured to independently and automatically actuate the two or more extendable and retractable self-leveling load-bearing feet 1020 to a configuration based on a position of the walking aid 910 relative to the walking surface 1045. In an aspect, controller 1030 includes circuitry configured to independently and automatically actuate the two or more extendable and retractable self-leveling load-bearing feet 1020 to a configuration based on a position of variance of the walking aid 910 from vertical.

In some embodiments, walking aid 910 of system 900 includes a user-activated control mechanism 1050 to control extension and retraction of the two or more extendable and retractable self-leveling load-bearing feet. In an aspect, the user-activated control mechanism 1050 is a voice-activated control mechanism. For example, the walking aid can include a microphone and circuitry configured to receive, process, and transmit a voice command to the controller. For example, the voice commands can include "on," "off" "extend," "retract," and the like. In an aspect, the user-activated control mechanism 1050 is a manually activated control mechanism. For example, the walking aid can include one or more buttons or other pressure sensitive pads and circuitry configured to receive and process a manual activation command, e.g., pushing of a button. In an aspect, at least a portion of the user-activated control mechanism 1050 is incorporated into hand grip 1015. For example, the hand grip can include a microphone for receiving a voice command. For example, the hand grip can include one or more pressure-sensitive buttons or pads for sending a manual activation command.

In some embodiments, walking aid 910 of system 900 includes at least one second sensor 1055 operably coupled to controller 1030 and configured to detect a parameter of the walking aid 910, wherein the controller 1030 includes circuitry configured to receive information regarding the detected parameter of the walking aid 910 from the at least one second sensor 1055 and circuitry configured to actuate at least one of the two or more extendable and retractable self-leveling load-bearing feet 1020 in response to the information regarding the detected parameter of the walking aid 910. In an aspect, the parameter of the walking aid comprises at least one of tip motion, movement, position of the walking aid relative to the walking surface, distance from the walking surface, and/or tilt angle of the walking aid relative to the walking surface. In an aspect, the at least one second sensor 1055 includes at least one of a tactile sensor, a tilt sensor, an inclinometer, an accelerometer, a gyroscope, a camera, a whisker sensor, a proximity sensor, or a pressure sensor. In an aspect, the proximity sensor comprises at least one of a photoelectric proximity sensor, an acoustic proximity sensor, and a capacitive proximity sensor.

In an aspect, at least one second sensor 1055 is configured to determine a movement of the walking aid 910 after it loses contact with the walking surface 1045. For example, an accelerometer in combination with a pressure sensor can be used to detect when the walking aid loses contact with the walking surface and what the movement of the walking aid looks like after losing contact. In an aspect, a tilt sensor or inclinometer in combination with accelerometers can measure the pitch and roll of the walking aid relative to the walking surface after the walking aid loses contact with the walking surface.

In an aspect, at least one second sensor 1055 is configured to detect tip motion at the first end 1005 or the second end 1010 of the linear rod 1000 after initial contact with the walking surface 1045. For example, the at least one second sensor can be used to detect a tipping motion or tilt of the walking aid relative to the walking surface after initial contact with the walking surface. For example, a 2-axis inclinometer with accelerometers can be used to measure a tipping motion or tilt of the walking aid relative to a walking surface.

In an aspect, controller 1030 is operably coupled to the at least one second sensor 1055 and includes circuitry configured to receive information regarding the detected parameter of the walking aid 910 from the at least one second sensor 1055 and circuitry configured to actuate at least one of the two or more extendable and retractable self-leveling load-bearing feet 1020 in response to the information regarding the detected parameter of the walking aid 910. For example, the controller can include circuitry configured to receive information regarding a tip motion of the walking aid, a movement of the walking aid, a position or orientation of the walking aid relative to the walking surface, a distance of the walking aid from the walking surface, or tilt angle or variance from vertical of the walking aid relative to the walking surface. For example, the controller can include circuitry configured to actuate at least one of the two or more extendable and retractable self-leveling load-bearing feet in response to information regarding at least one of a tip motion of the walking aid, a movement of the walking aid, a position or orientation of the walking aid relative to the walking surface, a distance of the walking aid from the walking surface, or a tilt angle or variance from vertical of the walking aid relative to the walking surface. For example, the controller can receive information from the at least one second sensor, e.g., an inclinometer or tilt meter, regarding the position, e.g., tilt, of the walking aid relative to the walking surface and accordingly adjust, e.g., extend or retract, at least one of the extendable and retractable self-leveling load-bearing feet.

In an aspect, controller 1030 includes circuitry configured to actuate at least one of the two or more extendable and retractable self-leveling load-bearing feet 1020 in response to movement of the walking aid 910 after it loses contact with the walking surface 1045. In an aspect, controller 1030 includes circuitry configured to actuate extension or retraction of at least one of the two or more extendable and retractable self-leveling load-bearing feet 1020 in response to movement of the walking aid 910 after it loses contact with the walking surface 1045. In an aspect, controller 1030 includes circuitry configured to actuate extension or retraction of at least one of the two or more extendable and retractable self-leveling load-bearing feet 1020 to orient said at least one of the two or more extendable and retractable self-leveling load-bearing feet 1020 relative to an orientation of the walking aid 910.

In some embodiments, walking aid 910 of system 900 includes an actuator 1060 operably coupled to the controller 1030 and configured to actuate the two or more extendable and retractable self-leveling load-bearing feet 1020. For example, the walking aid can include one or more motors operably coupled to the controller and configured to actuate the two or more extendable and retractable self-leveling load-bearing feet. In an aspect, the actuator 1060 comprises at least one of a spring, a motor, a pneumatic actuator, a hydraulic actuator, a linear actuator, a mechanical actuator, solenoid, or muscle wire. Not-limiting aspects of actuators for use in a walking aid have been described above herein.

In an aspect, walking aid 910 of system 900 includes a power source. In an aspect, the walking aid 910 includes one or more disposable batteries, e.g., cells, buttons, thin-film batteries, or microbatteries. For example, the components of the walking aid can be powered by a conventional battery, e.g., a disposable 9 volt battery. Non-limiting examples of disposable batteries include zinc-carbon, alkaline, lithium, zinc-chloride, zinc-air, or silver-oxide batteries. In an aspect, the one or more batteries include one or more rechargeable batteries. For example, the components of the walking aid can be powered by one or more rechargeable lithium-ion batteries. Non-limiting examples of rechargeable batteries include nickel-cadmium, nickel-zinc, nickel metal hydride, silver-zinc, or lithium ion.

In some embodiments, walking aid 910 of system 900 includes a mechanical energy harvester 1065 configured to store electrical or mechanical energy to power actuation of the two or more extendable and retractable self-leveling load-bearing feet 1020. In an aspect, the mechanical energy harvester stores mechanical energy generated when the walking aid periodically contacts the walking surface. In an aspect, the intermittent mechanical energy generated when the walking aid contacts the walking surface is converted into electrical energy through at least one of piezoelectric conversion, electro-active polymers (EAP) conversion, or electromagnetic conversion. In an aspect, the mechanical energy harvester stores electrical or mechanical energy for powering at least one actuator configured to the two or more extendable and retractable self-leveling load-bearing feet.

In some embodiments, walking aid 910 of system 900 includes warning system 1070 operably coupled to the controller 1030 and configured to alert a user. For example, the walking aid can include a warning system that alerts a user to a dangerous walking surface or situation. For example, the walking aid can include a warning system that alerts a user to the dangers of a slippery surface, e.g., an oily, icy, or water-covered surface). For example, the walking aid can include a warning system that alerts a user to dangers associated with a specific friction coefficient, e.g., too little or too much, that might create a dangerous walking situation. For example, the walking aid can include a warning system that alerts a user to the dangers of a slope in the walking surface, e.g., an incline or a decline of a percent grade that might be of difficulty for the user. For example, the walking aid can include a warning system that alerts a user to the proximity of an edge, e.g., an edge associated with a curb or a step. For example, the walking aide can include a warning system that alerts a user to poor load-bearing capability of a surface, e.g., the poor load-bearing capability of deep sand or thick grass.

In an aspect, warning system 1070 is at least one of an audible warning system, an optical warning system, or a haptic warning system. In an aspect, the warning system includes a speaker, a soundcard, and circuitry configured to broadcast an audible alert in response to receiving a warning signal from the controller. For example, the warning system can include an audible alert, e.g., a beeping sound or a warning voice. In an aspect, the warning system includes one or more light sources, e.g., light emitting diodes, and circuitry configured to emit an optical alert, e.g., a flashing red light, in response to receiving a warning signal from the controller. In an aspect, the warning system includes a vibrator and circuitry configured to vibrate at least a portion of the walking aid in response to receiving a warning signal from the controller. For example, the hand grip of the walking aid can include a haptic device, e.g., a vibrator, which vibrates the hand grip in response to a warning signal from the controller.

In an aspect, warning system 1070 is incorporated into the hand grip 1015 of the walking aid 910. In an aspect, at least one of an audible warning system, an optical warning system, or a haptic warning system is incorporated into hand grip 1015. For example, the warning system can include one or more lights, e.g., LEDs, incorporated into the hand grip that flash on/off to alert the user. For example, the warning system can include a speaker incorporated into the hand grip that emits an audible sound, e.g., a beeping sound, to alert the user. For example, the warning system can include a haptic vibration device that vibrates the hand grip of the walking device to alert the user.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will recognize that there are various vehicles by which processes and/or systems and/or other technologies disclosed herein can be effected (e.g., hardware, software, and/or firmware), and that the preferred vehicle will vary with the context in which the processes and/or systems and/or other technologies are deployed. For example, if an implementer determines that speed and accuracy are paramount, the surgeon may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies disclosed herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In a general sense the various aspects disclosed herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices disclosed herein, or a microdigital processing unit configured by a computer program which at least partially carries out processes and/or devices disclosed herein), electrical circuitry forming a memory device (e.g., forms of random access memory), and/or electrical circuitry forming a communications device (e.g., a modem, communications switch, or optical-electrical equipment). The subject matter disclosed herein may be implemented in an analog or digital fashion or some combination thereof.

At least a portion of the devices and/or processes described herein can be integrated into a data processing system. A data processing system generally includes one or more of a system unit housing, memory such as volatile or non-volatile memory, processors such as microprocessors or digital signal processors, computational entities such as operating systems, drivers, and applications programs, one or more interaction devices (e.g., a touch pad, a touch screen, an antenna, etc.), and/or control systems including feedback loops and control motors (e.g., feedback for sensing the walking surface and/or sensing the position of the walking aid relative to the walking surface; control actuators for actuating the extendable and retractable self-leveling load-bearing feet). A data processing system may be implemented utilizing suitable commercially available components, such as those typically found in data computing/communication and/or network computing/communication systems.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described component, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, devices, and objects should not be taken as limiting.

With respect to the use of substantially any plural and/or singular terms herein, the plural can be translated to the singular and/or from the singular to the plural as is appropriate to the context and/or application. The various singular/plural permutations are not expressly set forth herein for sake of clarity.

In some instances, one or more components can be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, changes and modifications can be made without departing from the subject matter described herein and its broader aspects and, therefore, the appended claims are to encompass within their scope all such changes and modifications as are within the true spirit and scope of the subject matter described herein. Terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A walking aid comprising:
   a linear rod having a first end and a second end;
   a hand grip disposed in proximity to the first end of the linear rod;
   two or more extendable and retractable load-bearing feet at the second end of the linear rod, wherein at least one of the two or more extendable and retractable load-bearing feet has two or more telescoping segments;
   at least one sensor configured to detect a parameter of a walking surface in proximity to the second end of the linear rod; and
   a controller including a microprocessor and circuitry, the controller operably coupled to the two or more extendable and retractable load-bearing feet and the at least one sensor and including circuitry configured to receive information regarding the detected parameter of the walking surface from the at least one sensor and circuitry configured to actuate at least one of the two or more extendable and retractable load-bearing feet in response to the information regarding the detected parameter of the walking surface.

2. The walking aid of claim 1, comprising a user-activated control mechanism to control extension and retraction of the two or more extendable and retractable load-bearing feet.

3. The walking aid of claim 1, wherein at least one of the two or more extendable and retractable load-bearing feet has a pivot at a connection to the linear rod.

4. The walking aid of claim 1, wherein at least one of the two or more extendable and retractable load-bearing feet has a pivot at a connection to the linear rod and one or more additional pivots along a length of the at least one of the two or more extendable and retractable load-bearing feet.

5. The walking aid of claim 1, wherein at least one of the two or more extendable and retractable load-bearing feet is rotatable.

6. The walking aid of claim 1, wherein at least one of the two or more extendable and retractable load-bearing feet is configured to retract for storage on a side of the linear rod.

7. The walking aid of claim 1, wherein at least one of the two or more extendable and retractable load-bearing feet is configured to retract for storage into an interior portion of the linear rod.

8. The walking aid of claim 1, wherein the at least one sensor comprises a tactile sensor, tilt sensor, an inclinometer, a texture sensor, an accelerometer, or a gyroscope.

9. The walking aid of claim 1, wherein the at least one sensor comprises at least one camera.

10. The walking aid of claim 1, wherein the at least one sensor includes at least one proximity sensor.

11. The walking aid of claim 1, wherein the at least one sensor includes at least one pressure sensor.

12. The walking aid of claim 1, wherein the parameter of the walking surface includes at least one of a surface type, a friction coefficient, a roughness, a slope, an edge, a height, a distance, or a bump.

13. The walking aid of claim 1, wherein the controller includes circuitry configured to actuate extension or retraction of at least one of the two or more extendable and retractable load-bearing feet in response to the information regarding the detected parameter of the walking surface before the at least one of the two or more extendable and retractable load-bearing feet contacts the walking surface.

14. The walking aid of claim 1, wherein the controller includes circuitry configured to independently and automatically actuate the two or more extendable and retractable load-bearing feet to a configuration based on a position of the walking aid relative to the walking surface.

15. The walking aid of claim 1, wherein the controller includes circuitry configured to independently and automatically actuate the two or more extendable and retractable load-bearing feet to a configuration based on a position variance of the walking aid from vertical.

16. The walking aid of claim 1, comprising at least one second sensor configured to detect a parameter of the walking aid.

17. The walking aid of claim 16, wherein the parameter of the walking aid comprises at least one of tip motion, movement, position relative to the walking surface, tilt angle relative to the walking surface, or distance from the walking surface.

18. The walking aid of claim 16, wherein the controller is operably coupled to the at least one second sensor, the controller including circuitry configured to receive information regarding the detected parameter of the walking aid from the at least one second sensor and circuitry configured to actuate at least one of the two or more extendable and retractable self leveling load-bearing feet in response to the information regarding the detected parameter of the walking aid.

19. The walking aid of claim 18, wherein the controller includes circuitry configured to actuate the at least one of the two or more extendable and retractable load-bearing feet in response to movement of the walking aid after it loses contact with the walking surface.

20. The walking aid of claim 18, wherein the controller includes circuitry configured to actuate the at least one of the two or more extendable and retractable load-bearing feet to orient said at least one of the two or more extendable and retractable load-bearing feet relative to an orientation of the walking aid.

21. The walking aid of claim 16, wherein the at least one second sensor configured to detect the parameter of the walking aid comprises at least one of a tactile sensor, a tilt sensor, an inclinometer, an accelerometer, a gyroscope, a camera, a whisker sensor, a proximity sensor, or a pressure sensor.

22. The walking aid of claim 1, comprising a mechanical energy harvester configured to store electrical or mechanical energy to power actuation of the two or more extendable and retractable load-bearing feet.

23. The walking aid of claim 1, comprising a warning system operably coupled to the controller and configured to alert a user, wherein the warning system comprises at least one of an audible warning system, an optical warning system, or a haptic warning system.

24. A system, comprising:
a walking aid including
a linear rod having a first end and a second end;
a hand grip disposed in proximity to the first end of the linear rod;
two or more extendable and retractable self leveling load-bearing feet at the second end of the linear rod;
at least one receiver; and
a controller attached to the linear rod and operably coupled to the at least one receiver and to the two or more extendable and retractable load-bearing feet; and
a remote signaling device in wireless communication with the at least one receiver of the walking aid, the remote signaling device configured to transmit a signal,
wherein the at least one receiver is configured to receive the signal from the remote signaling device and configured to transform the signal into information regarding a location of the walking aid in an environment,
wherein the controller includes circuitry configured to actuate at least one of the two or more extendable and retractable load-bearing feet based on the information regarding the location of the walking aid in the environment; and
wherein the controller includes circuitry configured to correlate the information regarding the location of the walking aid in the environment with a map of the environment.

25. The system of claim 24, wherein the walking aid includes at least one sensor operably coupled to the controller and configured to detect a parameter of a walking surface in proximity to the walking aid, wherein the controller includes circuitry configured to receive information regarding the detected parameter of the walking surface from the at least one sensor and circuitry configured to actuate at least one of the two or more extendable and retractable load-bearing feet in response to the information regarding the detected parameter of the walking surface.

26. The system of claim 25, wherein the at least one sensor comprises at least one of a tactile sensor, a tilt sensor, an inclinometer, a texture sensor, an accelerometer, a gyroscope, a camera, a whisker sensor, a proximity sensor, or a pressure sensor.

27. The system of claim 24, wherein the at least one receiver comprises an electromagnetic signal receiver, a radiofrequency signal receiver, a photodetector, or an infrared sensor.

28. The system of claim 24, wherein the at least one receiver comprises at least one magnetic signal receiver.

29. The system of claim 24, wherein the at least one receiver comprises at least one microphone.

30. The system of claim 24, wherein the remote signaling device includes one or more beacons.

31. The system of claim 30, wherein at least one of the one or more beacons emits a radio signal, a magnetic signal, an acoustic signal, an electromagnetic signal, or an optical signal.

32. The system of claim 24, wherein the remote signaling device includes an electromagnetic signal generator, a microwave signal generator, a magnetic signal generator, or an acoustic signal generator.

33. The system of claim 24, wherein the remote signaling device includes at least one of a radiofrequency signal generator and a radiofrequency signal receiver.

34. The system of claim 24, wherein the remote signaling device includes a local positioning system.

35. The system of claim 24, wherein at least one of the two or more extendable and retractable load-bearing feet has a pivot at a connection to the linear rod and two or more telescoping segments.

36. The system of claim 24, wherein at least one of the two or more extendable and retractable load-bearing feet has a pivot at a connection to the linear rod and one or more additional pivots along a length of the at least one of the two or more extendable and retractable load-bearing feet.

37. The system of claim 24, wherein at least one of the two or more extendable and retractable load-bearing feet is configured to retract for storage on a side of the linear rod.

38. The system of claim 24, wherein at least one of the two or more extendable and retractable load-bearing feet is configured to retract for storage into an interior portion of the linear rod.

39. The system of claim 24, wherein the walking aid includes at least one second sensor operably coupled to the controller and configured to detect a parameter of the walking aid, wherein the controller includes circuitry configured to receive information regarding the detected parameter of the walking aid from the at least one second sensor and circuitry configured to actuate at least one of the two or more extendable and retractable load-bearing feet in response to the information regarding the detected parameter of the walking aid.

40. The system of claim 24, wherein the walking aid includes a mechanical energy harvester configured to store electrical or mechanical energy to power actuation of the two or more extendable and retractable load-bearing feet.

41. The system of claim 24, wherein the walking aid includes a warning system operably coupled to the controller and configured to alert a user.

* * * * *